US009992429B2

(12) United States Patent
Baumert et al.

(10) Patent No.: US 9,992,429 B2
(45) Date of Patent: Jun. 5, 2018

(54) VIDEO PINNING

(71) Applicant: Microsoft Technology Licensing, LLC, Redmond, WA (US)

(72) Inventors: David Baumert, Sammamish, WA (US); Johnson T. Apacible, Mercer Island, WA (US); Stephen David Bader, Seattle, WA (US); Adam Edwin Behringer, Seattle, WA (US); Joseph Laurino, Sammamish, WA (US); Michelle Li, Seattle, WA (US); Hsiao-Lan Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/169,501

(22) Filed: May 31, 2016

(65) Prior Publication Data

US 2017/0347039 A1 Nov. 30, 2017

(51) Int. Cl.
*H04N 5/232* (2006.01)
*H04N 5/265* (2006.01)
*H04N 7/14* (2006.01)
*H04N 21/4728* (2011.01)
*H04N 21/6587* (2011.01)

(52) U.S. Cl.
CPC ......... *H04N 5/265* (2013.01); *H04N 5/23216* (2013.01); *H04N 5/23293* (2013.01); *H04N 7/147* (2013.01); *H04N 21/4728* (2013.01); *H04N 21/6587* (2013.01)

(58) Field of Classification Search
CPC . H04N 5/23203; H04N 5/23238; H04N 5/265
See application file for complete search history.

(56) References Cited

U.S. PATENT DOCUMENTS

| 5,828,371 | A  | 10/1998 | Cline et al. |
| 6,778,224 | B2 | 8/2004  | Dagtas et al. |
| 7,299,405 | B1 | 11/2007 | Lee et al. |
| 7,382,969 | B2 | 6/2008  | Dawson |
| 7,460,148 | B1 | 12/2008 | Clark et al. |
| 7,689,613 | B2 | 3/2010  | Candelore |
| 8,009,178 | B2 | 8/2011  | Chen et al. |

(Continued)

OTHER PUBLICATIONS

Baldwin, et al., "Hybrid Video Using Motion Estimation", In Proceedings of IEEE International Conference on Systems, Man, and Cybernetics, vol. 2, Oct. 8, 2000, pp. 1442-1447.

(Continued)

*Primary Examiner* — Abdelaaziz Tissire
(74) *Attorney, Agent, or Firm* — Drinker Biddle & Reath LLP

(57) ABSTRACT

Techniques for maintaining display of a portion of a video as the video continues to be displayed in a background are described herein. In some instances, a video may be captured at a first location and transmitted to a second location, where the video is output in real-time. As the video is displayed, a user may select a portion of the video to be paused. Based on the selection, the portion of the video may be paused while the rest of the video continues in a background. The background video may be displayed according to a different level of focus, image resolution, transparency, etc. than the portion of the video.

20 Claims, 12 Drawing Sheets

(56) References Cited

U.S. PATENT DOCUMENTS

| | | | |
|---|---|---|---|
| 8,341,662 | B1 | 12/2012 | Bassett et al. |
| 8,355,041 | B2 | 1/2013 | Chen et al. |
| 9,055,189 | B2 | 6/2015 | Su |
| 9,298,884 | B1 | 3/2016 | Ahmad |
| 9,363,471 | B2 | 6/2016 | Pycock et al. |
| 9,602,700 | B2 * | 3/2017 | Ahiska ............. G08B 13/19691 |
| 9,620,168 | B1 * | 4/2017 | Townsend ............. G11B 27/02 |
| 9,762,851 | B1 * | 9/2017 | Baumert ................ H04N 7/141 |
| 2002/0063711 | A1 * | 5/2002 | Park ...................... H04N 5/232 345/428 |
| 2003/0043172 | A1 | 3/2003 | Li et al. |
| 2003/0063133 | A1 | 4/2003 | Foote et al. |
| 2004/0201677 | A1 * | 10/2004 | Bronson .......... G08B 13/19663 348/207.1 |
| 2007/0086669 | A1 | 4/2007 | Berger et al. |
| 2007/0113255 | A1 * | 5/2007 | Kurosawa ........ G08B 13/19682 725/105 |
| 2007/0299912 | A1 | 12/2007 | Sharma et al. |
| 2008/0238947 | A1 * | 10/2008 | Keahey .................. G09G 5/363 345/666 |
| 2008/0300010 | A1 | 12/2008 | Border et al. |
| 2009/0097709 | A1 * | 4/2009 | Tsukamoto .......... H04N 5/2628 382/103 |
| 2009/0295830 | A1 * | 12/2009 | Muraveynyk ......... G06F 3/0481 345/629 |
| 2010/0146392 | A1 | 6/2010 | Duhig |
| 2010/0321533 | A1 * | 12/2010 | Park ...................... G06F 3/0481 348/239 |
| 2011/0216179 | A1 * | 9/2011 | Dialameh ......... G06F 17/30247 348/62 |
| 2011/0275045 | A1 | 11/2011 | Bhupathi et al. |
| 2012/0019722 | A1 | 1/2012 | Kwisthout et al. |
| 2012/0026343 | A1 * | 2/2012 | Ezoe ...................... H04N 7/183 348/207.1 |
| 2012/0249416 | A1 | 10/2012 | Maciocci et al. |
| 2013/0239050 | A1 * | 9/2013 | Ohashi .................. G06F 3/0481 715/800 |
| 2014/0100993 | A1 | 4/2014 | Farmer |
| 2014/0240516 | A1 * | 8/2014 | Kolarov ................. H04N 5/265 348/180 |
| 2014/0253693 | A1 * | 9/2014 | Shikata ................ H04N 1/2112 348/47 |
| 2015/0146078 | A1 | 5/2015 | Aarrestad et al. |
| 2015/0163561 | A1 | 6/2015 | Grevers, Jr. |
| 2015/0172550 | A1 * | 6/2015 | Bretscher ........... H04N 5/23293 348/140 |
| 2015/0253968 | A1 * | 9/2015 | Joo ..................... G06F 3/04842 715/798 |
| 2015/0341694 | A1 | 11/2015 | Hanko et al. |
| 2016/0191958 | A1 | 6/2016 | Nauseef et al. |

OTHER PUBLICATIONS

Boult, Terry, "Personal Panoramic Perception", In Proceedings of International Conference on Imaging Science, Systems, and Technology, Jun. 28, 1999, 7 pages.

Cote, Stephane, "Offline spatial panoramic video augmentation", Published on: Nov. 24, 2013 Available at: http://communities.bentley.com/other/old_site_member_blogs/bentley_employees/b/stephanecotes_blog/archive/2013/11/24/offline-spatial-panoramic-video-augmentation.

Hermans, et al., "Augmented Panoramic Video", In Journal of Eurographics, vol. 27, No. 2, Apr. 14, 2008, 10 pages.

"Huawei Max Presence", Retrieved on: Feb. 13, 2016 Available at: http://e.huawei.com/in/related-page/products/enterprise-network/telepresence-video-conferencing/immersive-telepresence-systems/max-presence/TPVC_MAX_PRESENCE.

Seo, et al., "Real-time panoramic video streaming system with overlaid interface concept for social media", In Journal of Multimedia Systems, vol. 20, Issue 6, Nov. 2014, 1 page.

Office Action for U.S. Appl. No. 15/169,453, dated Jan. 20, 2017, Baumert et al., "Shared Experience With Contextual Augmentation", 15 pages.

"International Search Report and Written Opinion Issued in PCT Application No. PCT/US2017/033440", dated Sep. 15, 2017, 14 Pages.

* cited by examiner

VIDEO PINNING

BACKGROUND

Video telepresence technologies enable individuals to communicate using audio and video. Such technologies generally involve capturing a video and audio of a first individual located at a first location, transmitting the video and audio over a network to a second individual located at a second location, and outputting the video and audio to the second individual. The first individual may also receive video and audio of the second individual. In this manner, the individuals may use cameras, display screens, microphones, and other equipment to facilitate a real-time conversation. However, the video telepresence technologies often provide relatively little insights into the content being displayed.

SUMMARY

This disclosure describes techniques for augmenting video content to enhance context of the video content. In some instances, a video may be captured at a first location and transmitted to one or more other locations, where the video is output. A context surrounding a user that is capturing the video and/or a user that is viewing the video may be used to augment the video with additional content. For example, the techniques may process speech or other input associated with one or more users, a gaze associated with one or more users, a previous conversation for one or more users, an area of interest identified by one or more users, a level of understanding of one or more users, an environmental condition, and so on. Based on the processing, the techniques may determine augmentation content (e.g., visual, audio, etc.) to provide with the video. The augmentation content may be displayed (or otherwise output) with the video in an overlaid manner to enhance the experience of the user viewing the video. The augmentation content may be displayed at a location of a feature within the video.

This disclosure also describes techniques for maintaining display of a portion of a video as the video continues to be displayed in a background. In some instances, a video may be captured at a first location and transmitted to a second location, where the video is output in substantially real-time. As the video is displayed, a user may select a portion of the video to be paused. Based on the selection, a frame of the video may be paused while the rest of the video continues to be presented in a background. The background video may be displayed according to a different level of focus, image resolution, transparency, etc. than the frame of the video.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
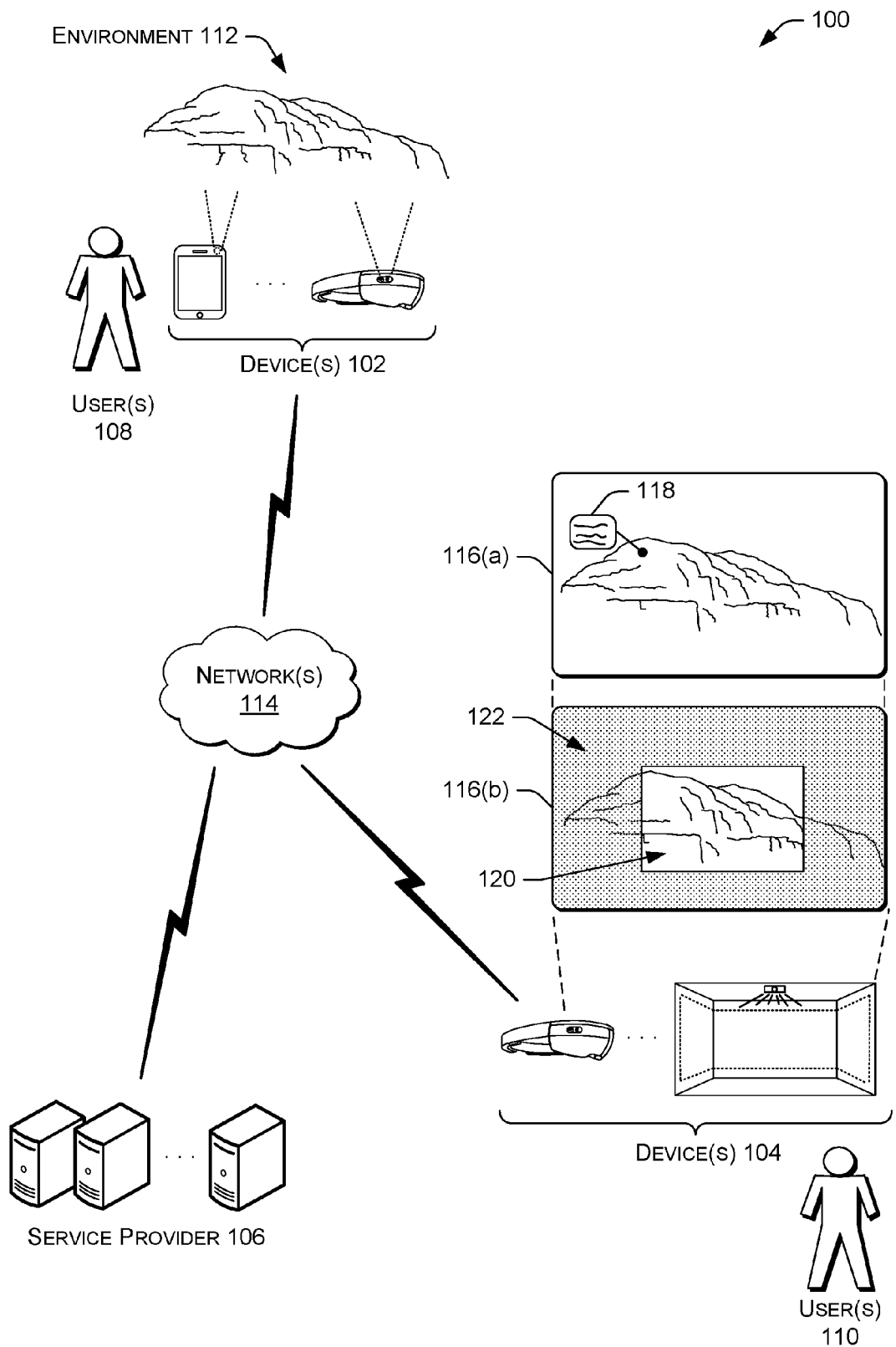
FIG. 1 illustrates an example architecture in which techniques described herein may be implemented.

This disclosure describes techniques for augmenting video content to enhance context of the video content. In some instances, a video may be captured at a first location and transmitted to a second location, where the video is output in real-time. A context surrounding a user that is capturing the video and/or a user that is viewing the video may be used to augment the video with additional content. For example, the techniques may analyze various information, such as speech input provided by a user, a gaze direction of a user, a level of understanding of a user, the video that is being captured, an environmental condition, user input identifying an area of interest, and so on, to identify content to provide with the video. The content may be displayed with the video in an overlaid manner on the video to enhance the experience of the user viewing the video.

To illustrate, a user may use a device to capture video of the user's environment as the user moves throughout the environment. The device may transmit the video to a service provider, where the video is sent to a remote user for viewing. The service provider may also determine augmentation content to add to the video to enhance the viewing experience of the remote user. This may include determining a context associated with the video, such as a context of the user capturing the video, a context of the user viewing the video, a context of the environment of the video, and so on. The service provider may then find augmentation content that relates to the context and provide the augmentation content for display in an overlaid manner over the video. In one example, the service provider may process speech input that is received from the user that is capturing the video to determine that the user is talking about a particular object in the user's environment. The service provider may then retrieve content that is related to the particular object and cause that content to be displayed to the remote user in an overlaid manner over the video. Here, the content may be displayed in relation to a location of the object within the video and maintained in relation to the location as the location of the object changes within the video. In another example, the service provider may process speech input associated with the remote user that is viewing the video to determine that the user has interest in a particular object displayed within the video (or has a question about the particular object) and to provide content that is related to the particular object.

This disclosure also describes techniques for maintaining display of a portion of a video as the video continues to be displayed in a background. In some instances, a video may be captured at a first location and transmitted to a second location, where the video is output in real-time. As the video is displayed to the user, the user may select a portion of the video to be paused. Based on the selection, the portion of the video may be paused while the rest of the video continues in a background. The background video may be displayed according to a different level of focus, image resolution, transparency, etc. than the portion of the video. This may enable the user that is viewing the video to examine or otherwise view the selected area of the video, while still allowing the video to continue in a background.

To illustrate, a user may use a device to capture video of the user's environment as the user moves throughout the environment. The device may transmit the video to a service provider, where the video is sent to a remote user in substantially real-time. As the remote user views the video, the user may select a particular area of the video, such as through a touch screen, gesture input, or other input. The service provider may identify a frame that was displayed when the remote user selection is made and a portion of the frame (or the entire frame) that corresponds to the area of the video. The service provider may then cause the portion of the frame to be paused and maintained in an overlaid manner over the rest of the video as the video continues in a background. The background video may be displayed with less focus, less image resolution, more transparency, and so on, than the portion of the frame. Thereafter, the service provider may receive a signal (e.g., from a user capturing the video, a user viewing the video, an automatic signal, etc.) to remove display of the portion of the frame. Such signal may cause the portion of the frame to be removed from being display and continue the video from where it is currently at (e.g., continue in full screen at real-time).

In many instances, the techniques discussed herein enhance a viewing experience. For example, augmentation content may be added to a video to provide various contextual information surrounding an environment from which the video is captured, a user that is capturing the video, a user that is viewing the video, and so on. In this way, a user viewing the augmented video may be better able to understand the subject matter depicted in the video. Further, this may eliminate time, effort, and/or computing resources needed for the user to perform manual searches to find content that is relevant to a video. Additionally, or alternatively, a portion of a video may be paused and maintained in a foreground, while the video continues in a background. This may enable the user that is viewing the video to examine or otherwise view the selected area of the video, while still allowing the video to continue to be displayed.

In some instances, the techniques may be implemented in the context of panoramic video. That is, panoramic video may be captured and/or displayed. A panoramic video may have a relatively wide-angle view, in comparison to traditional video. For example, a panoramic video may be associated with more than a particular degree of view angle (e.g., more than 90, 120, 150, 180, 210, 240, 270, 300, or 330 degrees). In one implementation, a panoramic video represents a 360-degree view angle. Although in other instances the techniques may be implemented in the context of other types of video or images, such as traditional video having a relatively narrow-angle view, a 3-dimensional video (3D), still images, and so on.

This brief introduction is provided for the reader's convenience and is not intended to limit the scope of the claims, nor the proceeding sections. Furthermore, the techniques described in detail below may be implemented in a number of ways and in a number of contexts. Example implementations and contexts are provided with reference to the following figures, as described below in more detail. However, the following implementations and contexts are only examples of many.

Example Architecture

FIG. 1 illustrates an example architecture 100 in which techniques described herein may be implemented. The architecture 100 includes one or more devices 102 (hereinafter "the device 102") configured to communicate with one or more devices 104 (hereinafter "the device 104") via a service provider 106. For example, one or more users 108 (hereinafter "the user 108") may employ the device 102 to communicate with one or more users 110 (hereinafter "the user 110") that employ the device 104. The user 108 and/or the user 110 may communicate through any communication modality, such as text, touch, gesture, sign language, speech, and so on. The device 102 may be configured to capture data of an environment 112 (e.g., real world environment) in which the user 108 is located and send the data to the service provider 106. The service provider 106 may send the data to the device 104 for output via the device 104. The device 104 may similarly capture data of an environment in which the user 110 is located and send the data to the device 102 via the service provider 106. The device 102, the device 104, and/or the service provider 106 may communicate via one or more networks 114. The one or more networks 114 may include any one or combination of multiple different types of networks, such as cellular networks, wireless networks, Local Area Networks (LANs), Wide Area Networks (WANs), Personal Area Networks (PANs), the Internet, and so on.

The device 102 and/or the device 104 may comprise any type of computing device, such as a laptop computer, a desktop computer, a server, a smart phone, an electronic reader device, a mobile handset, a personal digital assistant (PDA), a portable navigation device, a portable gaming device, a video game console, a tablet computer, a watch, a portable media player, a wearable device, a headset, a motion sensing device, a television, a computer monitor or display, a set-top box, a computer system in a vehicle, an appliance, a camera, a robot, a hologram system, a security system, a thermostat, a smoke detector, an intercom, a home media system, a lighting system, a heating, ventilation and air conditioning (HVAC) system, a home automation system, a projector, an automated teller machine (ATM), and so on. In some instances, a wearable device may comprise a watch, jewelry, a fitness tracking device, and so on. Further, in some instances a headset may comprise a head-mounted display (HMD) (e.g., an optical head-mounted display (OHMD)), a pair of mixed reality head-mounted smart glasses, a virtual reality headset, an audio headset, etc.

Although a wearable device and a headset are described separately, in some instances a wearable device may include a headset. Moreover, in some instances the computing device may be referred to as a mobile device, while in other instances the computing device may be referred to as a stationary device.

Meanwhile, the service provider 106 may include one or more computing devices, such as one or more desktop computers, laptop computers, servers, and so on. The one or more computing devices may be configured in a cluster, data center, cloud computing environment, or a combination thereof. In one example, the one or more computing devices provide cloud computing resources, including computational resources, storage resources and the like, that operate remotely to the device 102 and/or the device 104.

As discussed above, the device 102 and/or the device 104 may capture data of an environment and send the data to the service provider 106 to facilitate communication between the device 102 and/or the device 104. In some instances, the service provider 106 may facilitate a real-time telepresence video conference, while in other instances other types of technologies may be implemented in real-time or otherwise. For ease of illustration in the discussion of FIG. 1, the device 102 will be discussed in the context of providing video and other content to the device 104, where the video and other content is output to the user 110. Although video and other content may similarly be provided from the device 104 to the device 102 for output to the user 108. Further, content may be provided between any number of devices and/or users.

In some instances, the service provider 106 may augment content that is communicated to the device 102 and/or the device 104. Such augmentation may be based on various contexts, such as a context of the user 108 that is capturing video, a context of the user 110 that is viewing video, a context of the environment 112, and so on. For example, the service provider 106 may receive video, audio, and/or other content from the device 102 regarding the environment 112 and associate the video, audio, and/or other content with augmentation content. The augmentation content may generally add additional context to enhance the experience of the user 110 in viewing the video, audio, and/or other content. As illustrated, the service provider 106 may provide a user interface 116 via the device 104 to display a video of the environment 112 in which the user 108 is located. In the example of FIG. 1, the user interface 116(a) displays augmented content as a callout 118 over a video. The callout 118 may include any type of content, such as details regarding a mountain that has been identified in the video. Here, the callout 118 is positioned relative to a location of the mountain, so that the user 110 may view additional details regarding the mountain. Further details and examples of the augmentation processing will be discussed below.

Additionally, or alternatively, the service provider 106 may cause a portion of a video to be maintained as the video continues to be displayed in a background. In the example of FIG. 1, the user 110 has provided touch input through the device 104 to select an area 120 of a video. As such, the service provider 106 identifies a frame that was displayed when the selection was made and the user interface 116(b) pauses a portion of the frame of the video that corresponds to the area 120. Further, the user interface 116(b) continues displaying the rest of the video in a background 122. As shown, the background 122 displays the video in an out-of-focus (e.g., blurred manner). This allows the user 110 to view a particular portion of the video in a static manner and to maintain at least some context regarding current content that is being captured by the device 102. This may help avoid the user 110 from having to pause the entire video and miss what is current occurring at the device 102 (e.g., in the case of real-time content). Further details and examples of the video pinning processing will be discussed below.

The example architecture 100 may facilitate implementation of various technologies. In some examples, the service provider 106 may facilitate a Virtual Reality (VR) environment and/or Mixed Reality (MR) (e.g., an Augmented Reality (AR), augmented virtuality, etc.). In other examples, the service provider 106 may facilitate video teleconferencing, video chat, and so on. In yet other examples, the service provider 106 may facilitate broadcasting or other forms of distributing content. As such, the example architecture 100 may provide content in real-time, near real-time, non-real-time, and so on.

Although the example architecture 100 of FIG. 1 includes the service provider 106, in some instances the service provider 106 may be eliminated. For example, the device 102 may communicate directly with the device 104. Further, in the example of FIG. 1, the environment 112 represents an outdoor environment. However, in other examples the environment 112 may represent an indoor or any other environment in which a user may be located. Moreover, although may techniques are discussed in the context of augmenting and/or pausing video, the techniques may be implemented in the context of other types of content, such as still images, audio, animations, holograms, and so on.

Example Service Provider

Figure 2:
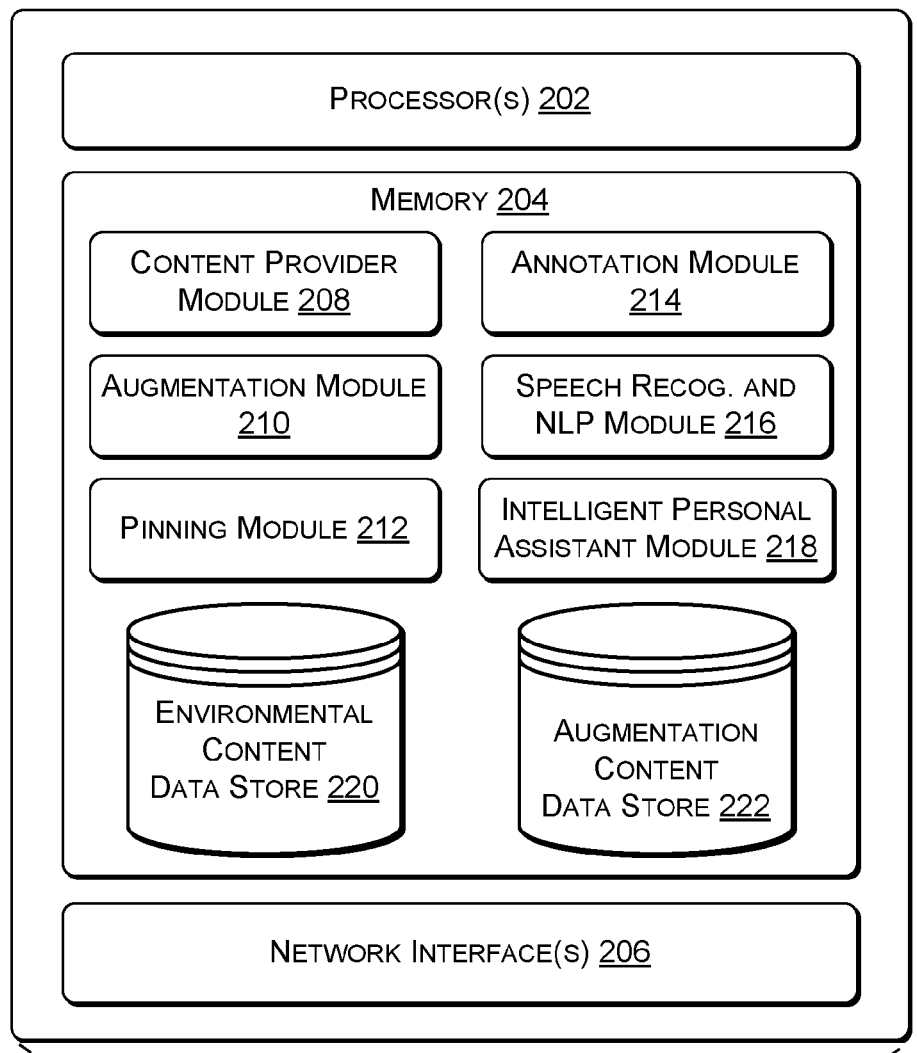
FIG. 2 illustrates example details of the service provider of FIG. 1.
Figure 2:
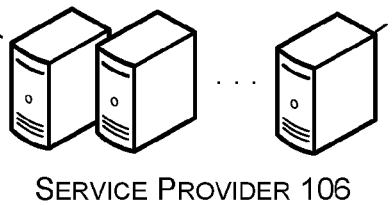

FIG. 2 illustrates example details of the service provider 106 of FIG. 1. The service provider 106 may be equipped with one or more processors 202, memory 204, and/or one or more network interfaces 206. The one or more processors 202 may include a central processing unit (CPU), a graphics processing unit (GPU), a microprocessor, and so on. The memory 204 may include modules executable by the one or more processors 202 to perform specific functionality (e.g., software functionality). The term "module" may represent example divisions of software for purposes of discussion, and is not intended to represent any type of requirement or required method, manner or organization. Accordingly, while various "modules" are discussed herein, their functionality and/or similar functionality could be arranged differently (e.g., combined into a fewer number of modules, broken into a larger number of modules, etc.). While certain functions and modules are described herein as being implemented by modules executable by one or more processors, any or all of the modules may be implemented in whole or in part by one or more hardware logic components to execute the described functions. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. As illustrated, the memory 204 may include a content provider module 208, an augmentation module 210, a pinning module 212, an annotation module 214, a speech recognition and Natural Language Processing (NLP) module 216, and an intelligent personal assistant module 218.

The content provider module 208 may receive and/or provide content to and/or from the device 102 and/or the device 104. In some instances, the content provider module 208 may receive data (e.g., video, audio, input, etc.) from a device that captures the data and send the data to another device. To illustrate, the content provider module 208 may facilitate live video teleconferencing between two devices, with or without augmentation content. Further, in some instances the content provider module 208 may retrieve video content (or any other environmental content) stored in an environmental content store 220 and provide the video content (or other environmental content) to a device for output. The environmental content data store 220 may generally store video, audio, input, or other data captured from an environment in which a user is located (also referred to as environmental content). The content provider module 208 may also provide augmentation content to a device together with data captured from an environment, or separately. For example, the content provider module 208 may cause the augmentation content to be displayed in an overlaid manner over video content.

The augmentation module 210 may determine augmentation content to provide with environmental content (e.g., data captured from an environment). To do so, the augmentation module 210 may analyze various information, such as speech input provided by a user, a gaze direction of a user, a level of understanding of a user, video that is being captured, an environmental condition, user input identifying an area of interest, and so on. Based on the analysis, the augmentation module 210 may identify augmentation content stored within an augmentation content data store 222 or elsewhere to provide with the video. In some instances, the augmentation module 210 may perform image processing (e.g., feature detection) to identify a feature within a video or still image. The feature may comprise an edge, corner, ridge, blob, object, and so on. In some instances, an object may be associated with more than one feature. The augmentation module 210 may use the feature to identify augmentation content. Further, the content provider module 208 may use the feature to position augmentation content in an overlaid manner over video content (e.g., in relation to a location of the feature).

In one illustration, the augmentation module 210 may determine augmentation content for a video based on input provided by a user. For instance, the user 108 that is capturing the video may provide speech or other input as the user 108 captures video of the environment 112. The speech or other input may discuss an object (e.g., a particular rock) within the environment 112. The augmentation module 210 may operate in cooperation with the speech recognition module and NLP module 216 (as discussed below) to determine that the speech or other input is referring to the object. The augmentation module 210 may then determine augmentation content that is related to the object, such as a description of how a rock was formed, the types of elements that form the rock, and so on. The augmentation content may be displayed to the user 110 as the video of the environment 112 is displayed to the user 110. Alternatively, or additionally, the augmentation module 210 may operate in cooperation with the speech recognition module and NLP module 216 to determine that speech or other input for the user 110 is referring to a particular object in the video. The augmentation module 210 may similarly identify and provide augmentation content that is relevant to the object via the device 104.

In another illustration, the augmentation module 210 may determine augmentation content for video based on a level of understanding of a user with respect to the video or other content that is output along with the video (e.g., audio provided by a user). For instance, the augmentation module 210 may determine (based on processing speech input by the speech recognition module and NLP module 216) that the user 108 is explaining the environment 112 in a more detailed manner than that which is understood by the user 110 that is viewing a video of the environment 112. Here, the augmentation module 210 may determine augmentation content that explains what the user 108 is stating (e.g., provides a higher level summary that may be better understood by the user 110). Alternatively, or additionally, the augmentation module 210 may determine that the user 108 is explaining the environment in a less detailed manner than a level at which the environment is understood by the user 110. Here, the augmentation module 210 may determine augmentation content that provides more detail than what the user 108 is stating.

A level of understanding of a user with respect to environmental content that is output may be based on various information. For example, a current conversation, previous conversation, or other input or content provided by a user may be analyzed to identify vocabulary usage, sentence/paragraph structure, length of sentences/paragraphs, etc. In another example, a user profile may indicate an education that a user has obtained, a primarily or secondary language that is understood by a user, demographic information for the user, or other information about the user.

In yet another illustration, the augmentation module 210 may determine augmentation content for a video based on an area of interest that is identified for the video. For instance, the augmentation module 210 may identify an area of the video that the user 110 is gazing at, an area of the video that is selected by the user 110 through touch/speech/gesture input, an area of the video that the user 110 is pointing at, an area of the video that is pinned (e.g., paused for examination), and so on. Alternatively, or additionally, the augmentation module 210 may identify an area in the video that corresponds to a location that the user 108 is gazing at within the environment 112 and/or an area in the video that corresponds to a location that the user 108 is pointing at. Upon identifying an area of interest, the augmentation module 210 may perform image processing to identify a feature within the area of interest and then identify augmentation content that is related to the feature.

In a further illustration, the augmentation module 210 may determine augmentation content for a video based on an interest of a user. For instance, if the user 110 that is viewing a video of the environment 112 has an interest in animals, and an animal is identified in the video, the augmentation module 210 may retrieve augmentation content that relates to the animal, such as details regarding the animal. Alternatively, or additionally, the augmentation module 210 may similarly retrieve augmentation content to be output to the user 110 based on an interest of a user that is capturing video (e.g., the user 108). An interest of a user may be based on a user profile for the user, a previous conversation with the user, purchase history, and so on.

In yet a further illustration, the augmentation module 210 may determine augmentation content for a video based on an environmental condition. An environmental condition may include a location of an environment, a temperature of the environment, a time of day at which video is being captured at the environment, and so on. For instance, for a video of a desert environment, the augmentation module 210 may retrieve augmentation content that describes a temperature of the desert.

Augmentation content may include any type of content, such as images, video, audio, animations, graphical user interface elements (e.g., icons, drop-down menus, etc.), visual representations (e.g., graphics), advertisements, and so on. Although augmentation content (also referred to as augmentation data) is illustrated as being stored within the memory 204 of the service provider 106 (e.g., within the augmentation content data store 222), in some instances the service provider 106 retrieves the augmentation content from other sources. For example, the service provider 106 may search online to find content that is related to an identified feature (e.g., object) within a video. The content may be retrieved and provided as augmentation content.

The pinning module 212 may cause display of a portion of a video to be maintained as the video continues to be displayed in a background. For example, as video is displayed via the device 104, the user 110 may select a portion of the video to be paused (e.g., through touch, text, gesture, or speech). The pinning module 212 may select a frame of the video that was displayed when the user 110 provided the selection. In instances, where the user 110 specifies a particular area within the video to be paused, the pinning module 212 may also identify a portion of the frame that corresponds to the selected area. In any case, the pinning module 212 may cause the frame (or portion of the frame) to be paused while the rest of the video continues in a background.

In some instances, the background video may be rendered according to a different level of focus, image resolution, transparency, etc. than the frame of the video. That is, the background video may be altered to a different format. For example, the background video may be displayed with a lower/greater level of focus, a lower/greater image resolution (e.g., spatial resolution, pixels per square inch (ppi), etc.), and/or more/less transparency than the frame. In some implementations, by displaying less detail in background content, processing resources and/or network bandwidth may be conserved.

In some instances, such as when an entire frame is selected to be paused (or a portion of a frame), the frame (or portion of the frame) may be shrunk or enlarged to a particular size. This may be a predetermined size or based on user input. Additionally, or alternatively, the frame (or portion of the frame) may be positioned at a particular location on a display screen (e.g., centered, in a right corner, in a left corner, etc.). For example, a user may provide touch input to move the frame (or portion of the frame) to a location. Alternatively, the frame (or portion of the frame) may be automatically positioned.

The pinning module 212 may also remove display of the frame (or the portion of the frame) when an event occurs or a signal is received. Upon removing display of the frame (or the portion of the frame), the video may continue in an unaltered form (e.g., original format) from where the video is at when the event occurs or signal is received. As one example, the pinning module 212 may receive user input from the device 102 and/or the device 104 to end display of the frame (or portion of the frame). The user input may be provided from the user 108 through the device 108 and/or provided from the user 110 through the device 104. The user input may comprise speech, text, touch, gesture, or any other input. In some instances, the user input may be provided through a button (e.g., physical button) on the device 102 and/or the device 104. As another example, the pinning module 212 may receive a trigger signal from the device 102 and/or the device 104 to end display of the frame (or portion of the frame). In some instances, the trigger signal is generated at the device 102 and sent to the service provider 106 when an event is detected at the device 102, such as arrival of the user 108 at a particular geographic location (e.g., a destination location of a tour, a start location of a tour, a predetermined location, etc.) or receipt of an audio signal that is associated with voice input from the user 108 (e.g., indicating that the user 108 has begun talking again). When the event is detected at the device 102, this may indicate that the user 108 desires to return the focus of the user 110 to video of the environment 112. In other instances, the trigger signal is generated at the device 104 and sent to the service provider 106 when an event is detected at the device 104, such as a lapse of a period of time since initiating display of the frame (or portion of the frame) or receipt of an audio signal associated with voice input (e.g., a predetermined command). When the event is detected at the device 104, this may indicate a desire of the user 110 to return focus to the entire video of the environment 112.

The annotation module 214 may associate annotation data with video. For example, when a frame of a video is paused, the user 110 may provide annotation data to associate with the frame. The annotation data may comprise an image (e.g., a picture of a user), audio, text, video, written content (e.g., through a stylus), or any other content. The annotation module 214 may analyze the frame of the video that is paused to identify a geographic location associated with the frame. For example, the annotation module 214 may identify a location of a landmark included within the video. The annotation module 214 may then associate the annotation data with the geographic location and/or the frame of the video. In some instances, this may allow the user 110 to leave a note or other content with a particular location, so that another user may view the note or other content when visiting the location. In some embodiments, a user may associate annotation data with a particular object/feature within a video by providing user input to position the annotation data. For example, the user may upload annotation data, which is then viewed on a display screen, and then provide touch input (or other forms of input) to position the annotation data relative to a particular object/feature within a video. The annotation module 214 may create a link between the particular object/feature and the annotation data (including determining a geographic location of the particular object/feature and associating the annotation data with the geographic location). This may allow the annotation data to be viewed by other users when viewing the geographic location and/or the particular object/feature in a video.

The speech recognition and NLP module 216 may convert speech into text or another form of data and/or perform various operations to process input (e.g., the text or other form of data). For example, the speech recognition and NLP module 216 may receive natural language input from the device 102 and/or the device 104 and derive a meaning of the speech input. The speech recognition and NLP module 216 may operate in cooperation with any other module of the service provider 106 to facilitate various functionality related to natural language input, such as speech input, text input, and so on.

The intelligent personal assistant module 218 may provide an intelligent personal assistant via the device 102 and/or the device 104. In some instances, the user 108 and/or the user 110 may communicate with the intelligent personal assistant to augment video content, pause a frame of video, or perform other operations. To illustrate, the user 110 may carry out a conversation with the intelligent personal assistant to request augmentation content associated with a particular object (e.g., "what is she talking about," "please provide me with more information on lichen," "which petroglyph is she referring to," etc.). The intelligent personal assistant module 218 may communicate with the augmentation module 210 and/or other modules to provide augmentation content back to the user 110. In another illustration, the user 110 may speak with the intelligent personal assistant to pause a frame of a video and/or remove display of the frame of the video (e.g., "pause that frame," "return to live video," etc.).

Example Device

Figure 3:
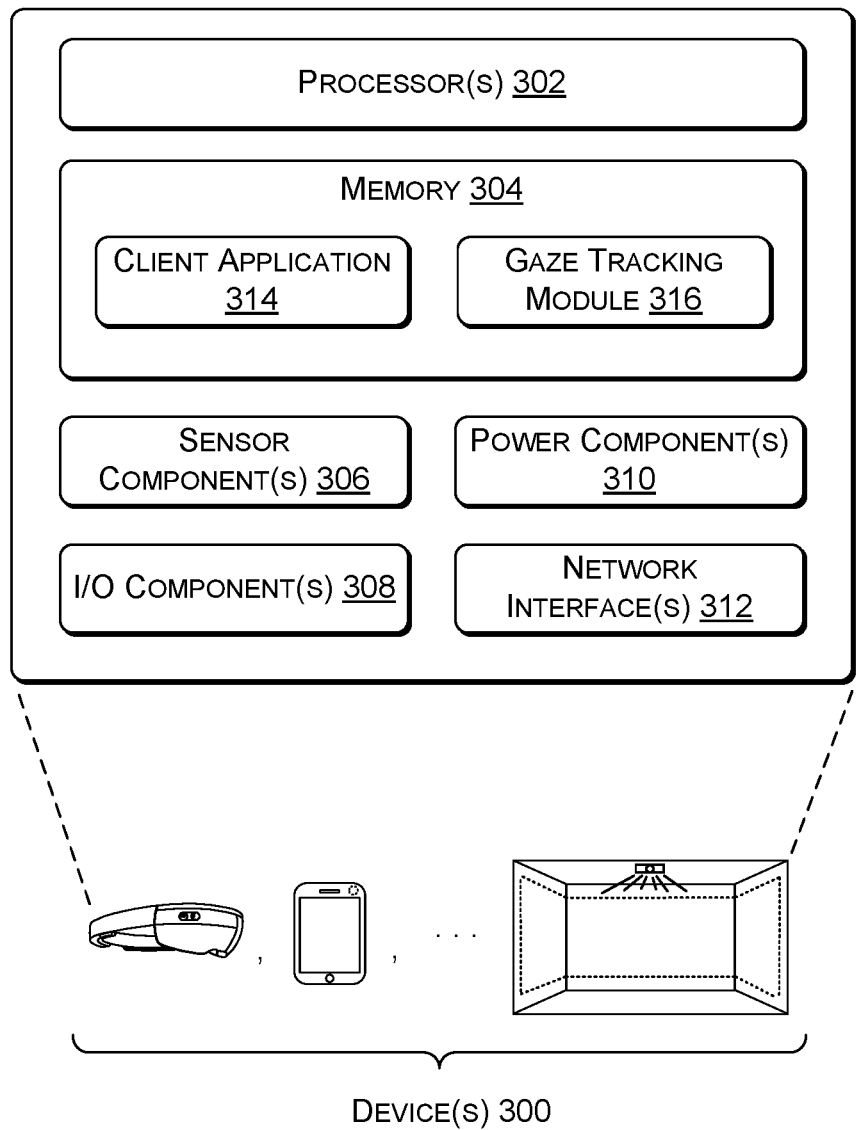
FIG. 3 illustrates example details of a computing device of FIG. 1.

FIG. 3 illustrates example details of a computing device 300, such as the device 102 and/or the device 104 of FIG. 1. The computing device 300 may include or be associated with one or more processors 302, memory 304, one or more sensor components 306, one or more I/O components 308, one or more power components 310, and one or more network interfaces 312. The one or more processors 302 may include a central processing unit (CPU), graphics processing unit (GPU), a microprocessor, and so on.

The one or more sensor components 306 may include a magnetometer, an ambient light sensor, a proximity sensor, an accelerometer, a gyroscope, a Global Positioning System sensor ("GPS sensor"), a depth sensor, an olfactory sensor, a temperature sensor, a shock detection sensor, a strain sensor, a moisture sensor.

The magnetometer may be configured to measure the strength and direction of a magnetic field. In some configurations the magnetometer provides measurements to a compass application program in order to provide a user with accurate directions in a frame of reference including the cardinal directions, north, south, east, and west. Similar measurements may be provided to a navigation application program that includes a compass component. Other uses of measurements obtained by the magnetometer are contemplated.

The ambient light sensor may be configured to measure ambient light. In some configurations, the ambient light sensor provides measurements to an application program in order to automatically adjust the brightness of a display to compensate for low-light and high-light environments. Other uses of measurements obtained by the ambient light sensor are contemplated.

The proximity sensor may be configured to detect the presence of an object or thing in proximity to the computing device without direct contact. In some configurations, the proximity sensor detects the presence of a user's body (e.g., the user's face) and provides this information to an application program that utilizes the proximity information to enable or disable some functionality of the computing device. For example, a telephone application program may automatically disable a touchscreen in response to receiving the proximity information so that the user's face does not inadvertently end a call or enable/disable other functionality within the telephone application program during the call. Other uses of proximity as detected by the proximity sensor are contemplated.

The accelerometer may be configured to measure proper acceleration. In some configurations, output from the accelerometer is used by an application program as an input mechanism to control some functionality of the application program. For example, the application program may be a video game in which a character, a portion thereof, or an object is moved or otherwise manipulated in response to input received via the accelerometer. In some configurations, output from the accelerometer is provided to an application program for use in switching between landscape and portrait modes, calculating coordinate acceleration, or detecting a fall. Other uses of the accelerometer are contemplated.

The gyroscope may be configured to measure and maintain orientation. In some configurations, output from the gyroscope is used by an application program as an input mechanism to control some functionality of the application program. For example, the gyroscope may be used for accurate recognition of movement within a 3D environment of a video game application or some other application. In some configurations, an application program utilizes output from the gyroscope and the accelerometer to enhance control of some functionality of the application program. Other uses of the gyroscope are contemplated.

The GPS sensor may be configured to receive signals from GPS satellites for use in calculating a location. The location calculated by the GPS sensor may be used by any application program that requires or benefits from location information. For example, the location calculated by the GPS sensor may be used with a navigation application program to provide directions from the location to a destination or directions from the destination to the location. Moreover, the GPS sensor may be used to provide location information to an external location-based service. The GPS sensor may obtain location information generated via WI-FI, WIMAX, and/or cellular triangulation techniques utilizing one or more of network connectivity components to aid the GPS sensor in obtaining a location fix. The GPS sensor may also be used in Assisted GPS ("A-GPS") systems.

The one or more I/O components 308 may sense conditions of an individual or surroundings of the individual. The one or more I/O components 308 may include one or more user facing cameras or other sensors for tracking eye movement or gaze, facial expressions, pupil dilation and/or contraction, gestures, and/or other characteristics of the user. In some examples, one or more I/O components 308 may include one or more outwardly facing or environmental cameras for capturing images of real-world objects and surroundings of the individual (including panoramic images/video). The one or more I/O components 308 may additionally, or alternatively, include one or more biometric sensors (e.g., a galvanic skin response sensor for measuring galvanic skin response, a heart rate monitor, a skin temperature sensor for measuring the temperature on the surface of the skin, an electroencephalography (EEG) device for measuring electrical activity of the brain, an electrocardiography (ECG or EKG) device for measuring electrical activity of the heart), one or more other cameras (e.g., web cameras, infrared cameras, depth cameras, etc.), microphones or other sound sensors for measuring a volume of speech, a rate of speech, etc., light sensors, optical scanners, or the like.

Additionally, and/or alternatively, the one or more I/O components 308 may include a display, a touchscreen, a data I/O interface component ("data I/O"), an audio I/O interface component ("audio I/O"), a video I/O interface component ("video I/O"), and/or a camera. In some configurations, the display and the touchscreen are combined. In some configurations two or more of the data I/O component, the audio I/O component, and the video I/O component are combined. The I/O components may include discrete processors configured to support various interface, or may include processing functionality built-in to a processor.

The display may be an output device configured to present information in a visual form. In particular, the display may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display is a liquid crystal display ("LCD") utilizing any active or passive matrix technology and any backlighting technology (if used). In some configurations, the display is an organic light emitting diode ("OLED") display. In some configurations, the display is a holographic display. Further, in some configurations, the display is a panoramic display. Moreover, in some configurations, the display is configured to display 3D content. Other display types are contemplated.

In at least one example, the display may correspond to a hardware display surface. The hardware display surface may be configured to graphically associate holographic user interfaces and other graphical elements with an object seen through the hardware display surface or rendered objects displayed on the hardware display surface.

The touchscreen may be an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen is incorporated on top of the display as a transparent layer to enable a user to use one or more touches to interact with objects or other information presented on the display. In other configurations, the touchscreen is a touch pad incorporated on a surface of the computing device that does not include the display. For example, the computing device may have a touchscreen incorporated on top of the display and a touch pad on a surface opposite the display.

In some configurations, the touchscreen is a single-touch touchscreen. In other configurations, the touchscreen is a multi-touch touchscreen. In some configurations, the touchscreen is configured to detect discrete touches, single touch gestures, and/or multi-touch gestures. These are collectively referred to herein as gestures for convenience. Some example gestures will now be described. It should be understood that these gestures are illustrative. Moreover, the described gestures, additional gestures, and/or alternative gestures may be implemented in software for use with the touchscreen. As such, a developer may create gestures that are specific to a particular application program.

In some configurations, the touchscreen supports a tap gesture in which a user taps the touchscreen once on an item presented on the display. The tap gesture may be used to perform various functions including, but not limited to, opening or launching whatever the user taps. In some configurations, the touchscreen supports a double tap gesture in which a user taps the touchscreen twice on an item presented on the display. The double tap gesture may be used to perform various functions including, but not limited to, zooming in or zooming out in stages. In some configurations, the touchscreen supports a tap and hold gesture in which a user taps the touchscreen and maintains contact for at least a pre-defined time. The tap and hold gesture may be used to perform various functions including, but not limited to, opening a context-specific menu.

In some configurations, the touchscreen supports a pan gesture in which a user places a finger on the touchscreen and maintains contact with the touchscreen while moving the finger on the touchscreen. The pan gesture may be used to perform various functions including, but not limited to, moving through screens, images, or menus at a controlled rate. Multiple finger pan gestures are also contemplated. In some configurations, the touchscreen supports a flick gesture in which a user swipes a finger in the direction the user wants the screen to move. The flick gesture may be used to perform various functions including, but not limited to, scrolling horizontally or vertically through menus or pages. In some configurations, the touchscreen supports a pinch and stretch gesture in which a user makes a pinching motion with two fingers (e.g., thumb and forefinger) on the touchscreen or moves the two fingers apart. The pinch and stretch gesture may be used to perform various functions including, but not limited to, zooming gradually in or out of a web site, map, or picture.

Although the above gestures have been described with reference to the use of one or more fingers for performing the gestures, other appendages such as toes or objects such as styluses may be used to interact with the touchscreen. As such, the above gestures should be understood as being illustrative and should not be construed as being limited in any way.

The data I/O interface component may be configured to facilitate input of data to the computing device and output of data from the computing device. In some configurations, the data I/O interface includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component is configured to provide audio input and/or output capabilities to the computing device. In some configurations, the audio I/O interface component includes a microphone configured to collect audio signals. In some configurations, the audio I/O interface component includes a headphone jack configured to provide connectivity for headphones or other external speakers. In some configurations, the audio I/O interface component includes a speaker for the output of audio signals. In some configurations, the audio I/O interface component includes an optical audio cable out.

The video I/O interface component is configured to provide video input and/or output capabilities to the computing device. In some configurations, the video I/O interface component includes a video connector configured to receive video as input from another device (e.g., a video media player such as a DVD or BLURAY player) or send video as output to another device (e.g., a monitor, a television, or some other external display). In some configurations, the video I/O interface component includes a High-Definition Multimedia Interface ("HDMI"), mini-HDMI, micro-HDMI, DisplayPort, or proprietary connector to input/output video content. In some configurations, the video I/O interface component or portions thereof is combined with the audio I/O interface component or portions thereof.

The camera may be configured to capture still images and/or video. The camera may utilize a charge coupled device ("CCD") or a complementary metal oxide semiconductor ("CMOS") image sensor to capture images. In some configurations, the camera includes a flash to aid in taking pictures in low-light environments. Settings for the camera may be implemented as hardware or software buttons. Images and/or video captured by camera may additionally or alternatively be used to detect non-touch gestures, facial expressions, eye movement, or other movements and/or characteristics of the user.

Although not illustrated, one or more hardware buttons may also be included in the device 300. The hardware buttons may be used for controlling some operational aspect of the device 300. The hardware buttons may be dedicated buttons or multi-use buttons. The hardware buttons may be mechanical or sensor-based.

The one or more power components 310 may include one or more batteries, which may be connected to a battery gauge. The batteries may be rechargeable or disposable. Rechargeable battery types include, but are not limited to, lithium polymer, lithium ion, nickel cadmium, and nickel metal hydride. Each of the batteries may be made of one or more cells.

The battery gauge may be configured to measure battery parameters such as current, voltage, and temperature. In some configurations, the battery gauge is configured to measure the effect of a battery's discharge rate, temperature, age and other factors to predict remaining life within a certain percentage of error. In some configurations, the battery gauge provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The one or more power components 310 may also include a power connector, which may be combined with one or more of the aforementioned I/O components. The one or more power components may interface with an external power system or charging equipment via a power I/O component.

The memory 304 (as well as the memory 204 of the service provider 106 and all other memory described herein) may include one or a combination of computer-readable media. Computer-readable media may include computer storage media and/or communication media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), resistive random-access memory (ReRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media (also referred to as "computer-readable storage media") does not include communication media.

As illustrated, the memory 304 may include a client application 314 to facilitate various processing. For example, the client application 314 may communicate with any of the modules 208-218 of the service provider 106 to facilitate the functionality discussed herein. Additionally, or alternatively, the client application 314 may provide a user interface.

Further, the memory 304 may include a gaze tracking module 316 to track a gaze of an individual. In various implementations, the gaze tracking module 316 may obtain images of at least one eye of an individual and analyze the images to determine eye position of an individual. The eye positions of an individual may be used to determine the gaze path of the individual. In particular implementations, the eye positions of an individual may be used to determine a direction in which an individual is looking. In some cases, the gaze path of an individual may be approximated as a cone shaped field of view or a triangular prism shaped field of view into a scene.

The gaze tracking module 316 may also identify objects included in the gaze path of an individual. In particular implementations, the gaze tracking data module 316 may obtain information indicating positions of objects included in an environment that an individual is viewing. In some cases, the gaze tracking data module 316 may obtain images of an environment and utilize the images of the environment to determine locations of objects included in the environment. In an illustrative example, the gaze tracking data module 316 may determine distances between objects included in an environment and a reference point of the environment. In addition, the gaze tracking data module 316 may determine distances between objects included in an environment and an individual viewing the environment. The gaze tracking data module 316 may determine overlap between the gaze path of an individual and the location of one or more objects in an environment. The one or more objects included in the gaze path of the individual may be specified as gaze targets.

Example Interfaces

FIGS. 4-8 illustrate example interfaces that may be provided to implement the techniques discussed herein. Although a particular technique may be discussed in reference to a particular figure, the particular technique may be performed in reference to any of the figures. For ease of illustration, the interfaces of FIGS. 4-8 are discussed as being provided within the context of the architecture 100 of FIG. 1. In particular, the interfaces are discussed as being provided to the user 110 via the device 104 as the user 108 employs the device 102 to capture environmental content (e.g., a video, audio, etc.) of the environment 112. Although the interfaces may alternatively, or additionally, be provided to the user 108 and/or in other contexts.

Figure 4:
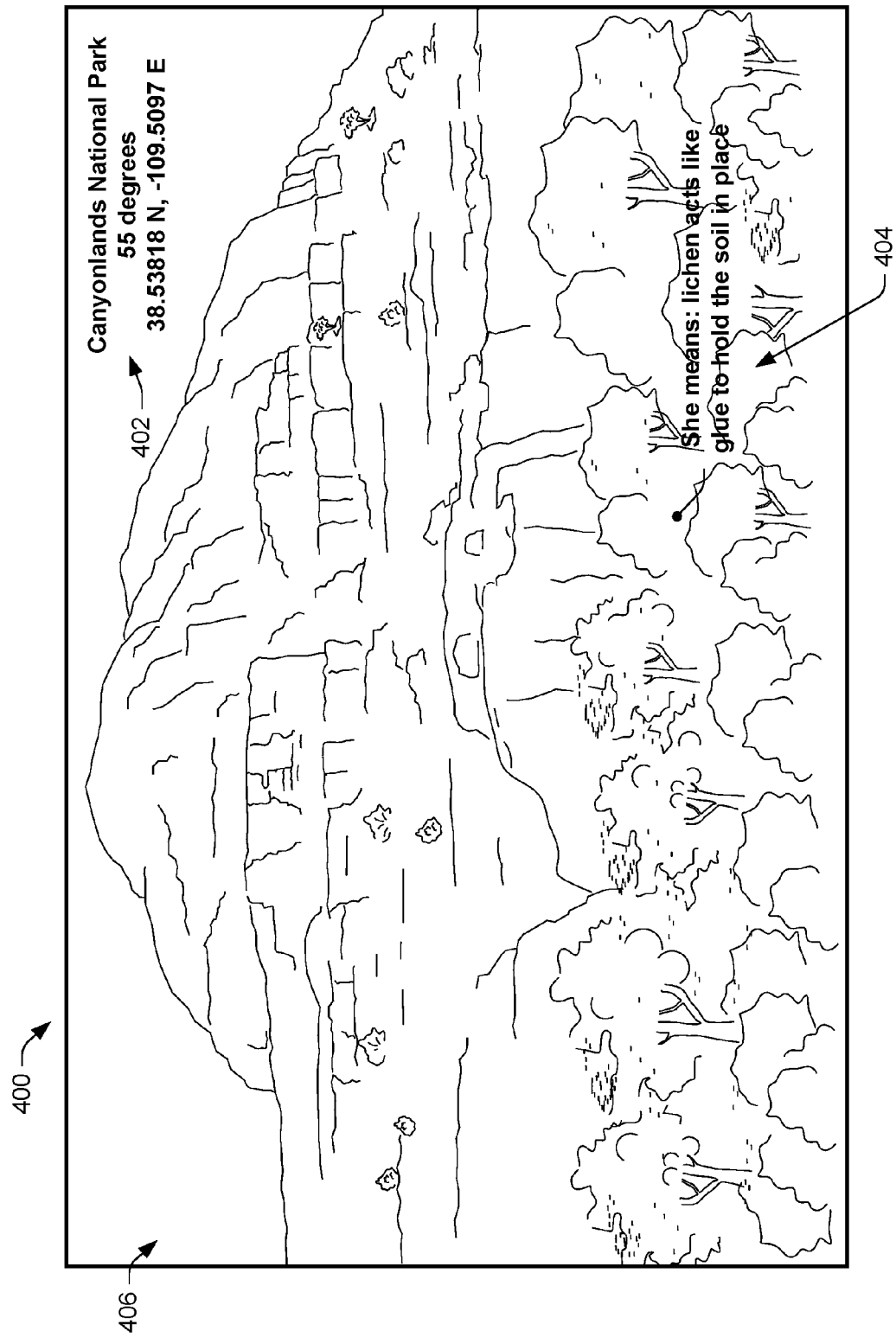
FIG. 4 illustrates an example interface to display augmentation content that is relevant to an environment and augmentation content that is relevant to speech input provided by a user.

FIG. 4 illustrates an example interface 400 to display augmentation content 402 that is relevant to the environment 112 and augmentation content 404 that is relevant to speech input provided by the user 108 and/or the user 110. In this example, the user 108 is having a conversation with the user 110 as video 406 is being captured of the environment 112 and provided to the user 110. As illustrated, the video 406 may be presented via the interface 400. In addition, the augmentation content 402 and/or the augmentation content 404 may be provided in an overlaid manner on the video 402.

The augmentation content 402 may relate to an environmental condition of the environment 112, such as a geographic location of the environment 112, a temperature of the environment 112, a time of day when the video 406 is being captured, and so on. For example, the service provider 106 may use location data provided by the device 102 to provide a location of the user 108 (e.g., Canyonlands National Park). The service provider 106 may also use image processing to provide a location of an object that is being filmed (e.g., a longitude and latitude of a rock structure in the video 406). The augmentation content 402 may also include a temperature of the environment 112 taken from a temperature sensor on the device 102 and/or another source (e.g., an online resource).

Meanwhile, the augmentation content 404 may relate to speech input that is received from the user 108 and/or the user 110. For example, the user 108 may be providing a rather detailed discussion of lichen as the user 108 moves throughout the environment 112. The service provider 106 may determine that the user 110 (that is viewing the video 406) may not fully comprehend the speech provided by the user 108 (e.g., the user 108 may have a higher level of education for the topic being discussed in comparison to the user 110, the user 110 may ask a question—"what is she referring to?" etc.). As such, the service provider 106 may augment the video 406 with the augmentation content 404 to provide a more simplified discussion of lichen (i.e., "she means: lichen acts like glue to hold the soil in place"). Here, the augmentation content 404 is displayed with a callout pointing to a location on the video 406 where lichen is located. The location may be determined by performing image processing on the video 406.

Figure 5:
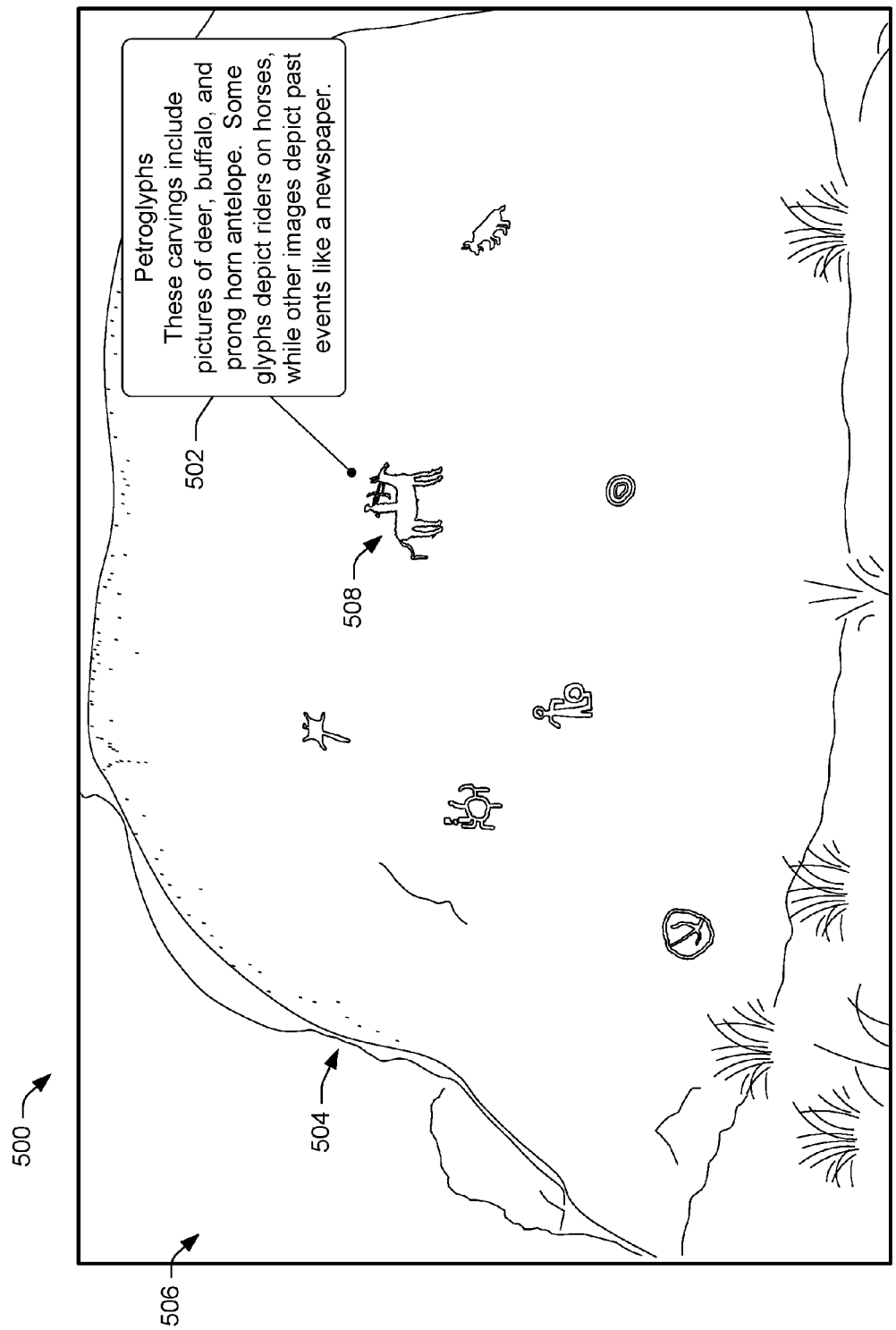
FIG. 5 illustrates an example interface to display augmentation content for an object that is identified through image processing.

FIG. 5 illustrates an example interface 500 to display augmentation content 502 for an object that is identified through image processing. In particular, as the user 108 moves throughout the environment 112 and discovers a rock 504 having petroglyphs, the service provider 106 may analyze a video 506 of the environment 112 to identify a petroglyph 508 that may be of interest to the user 108 and/or the user 110. For example, the service provider 106 may perform image processing on a central area of the video 506, an area of the video 506 where the user 108 and/or the user 110 is looking, and/or another area of the video 506. The image processing may identify the petroglyph 508. Additionally, or alternatively, the service provider 106 may determine that the user 108 and/or the user 110 are discussing a particular type of petroglyph (e.g., a horse). As such, the service provider 106 may cause the augmentation content 502 to be presented on the video 506 and anchored to the location of the petroglyph 508. As illustrated, the augmentation content 502 may provide information about the petroglyph 508.

Figure 6:
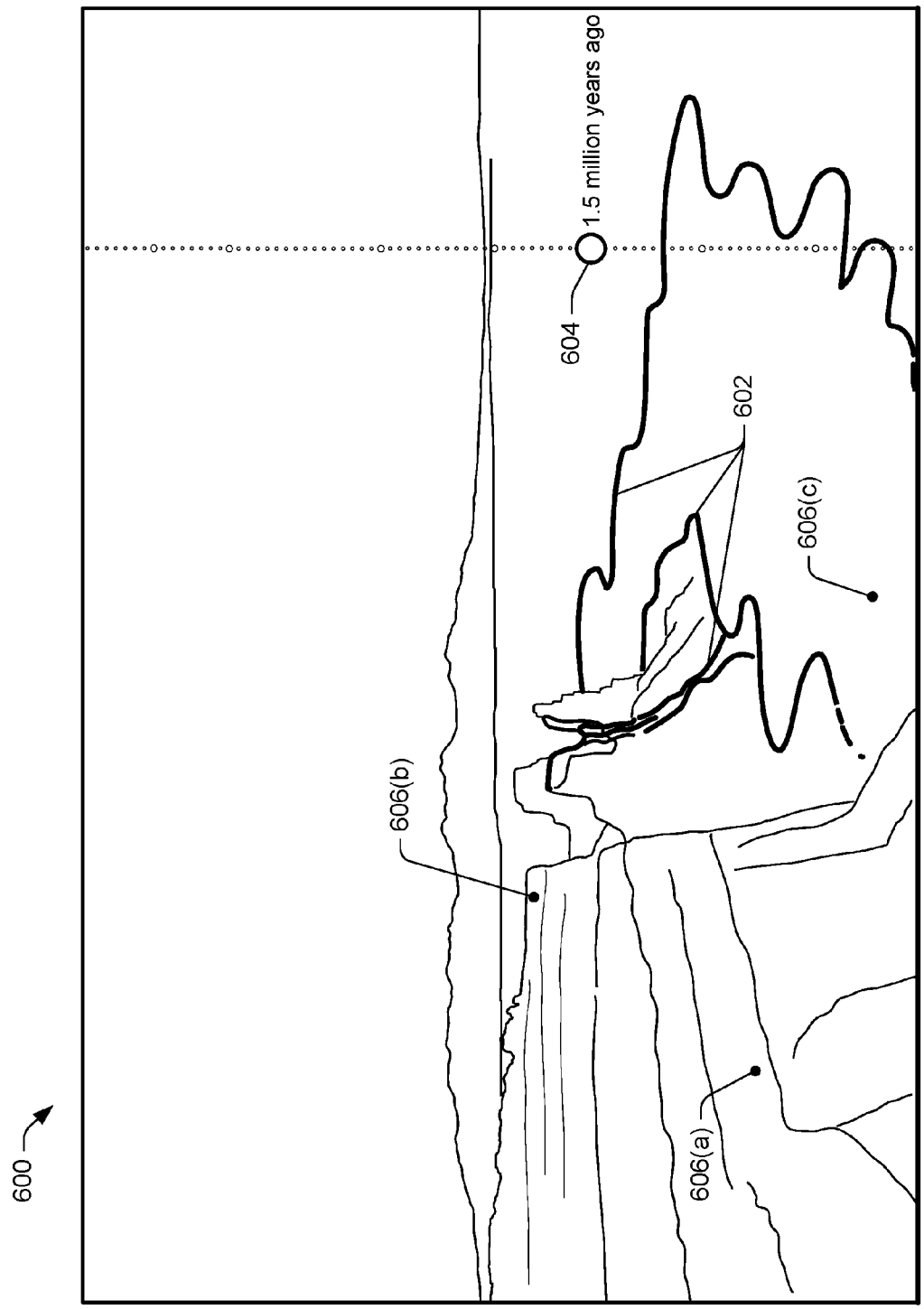
FIG. 6 illustrates an example interface to display augmentation content as an animation.

FIG. 6 illustrates an example interface 600 to display augmentation content 602 as an animation. Here, the service provider 106 has identified an animation that depicts how rock within the environment 112 was formed. The augmentation content 602 may be obtained from a variety of sources, including an online site associated with the environment 112 (e.g., a web page for the Canyonlands National Park). The augmentation content 602 may show the environment 112 as it was initially formed 1.5 million years ago and change form as time continues to a current point in time. As illustrated, an icon 604 may be presented to show the year that is being presented.

The interface 600 may also display augmentation content indicating locations 606 that may be explored. The locations 606 may represent locations of cameras within the environment 112. For example, the user 110 that is viewing the interface 600 may select the location 606(a) and be transferred to a camera that is located at the selected location 606(a) to further explore the environment 112 from a different perspective. In some instances, the locations 606 represent locations of other users that have cameras. Here, the locations 606 may move as the users move within the environment 112. In other instances, the locations 606 represent stationary locations of web cameras or other types of cameras (e.g., web cameras positioned with the park, traffic cameras, and so on). The service provider 106 may retrieve information regarding the locations 606 of the cameras (e.g., GPS information of users that have cameras, geographic data for web cameras, etc.) and perform image processing on the video to position the augmentation content at the appropriate locations.

Figure 7A:
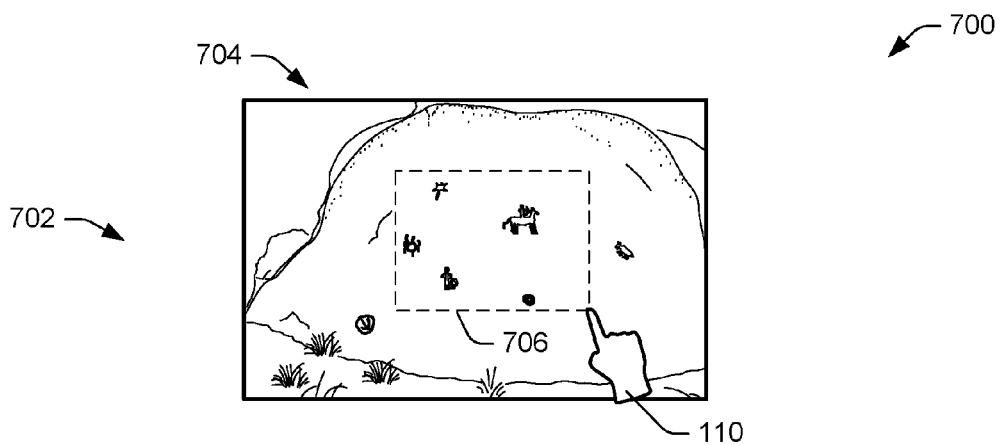
FIGS. 7A-7C illustrate an example process of pausing a portion of a video while the rest of the video continues in a background.
Figure 7B:
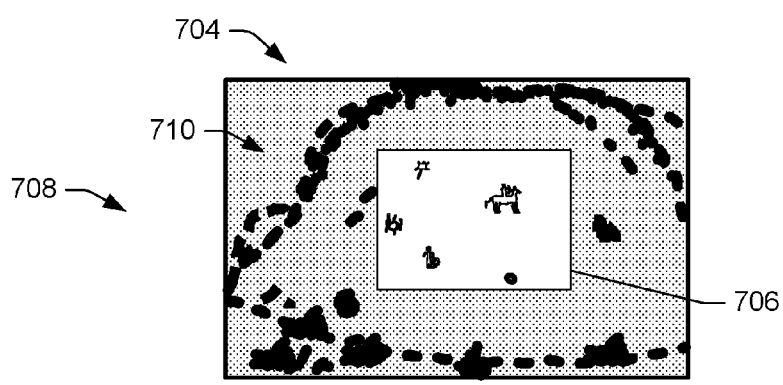
Figure 7C:
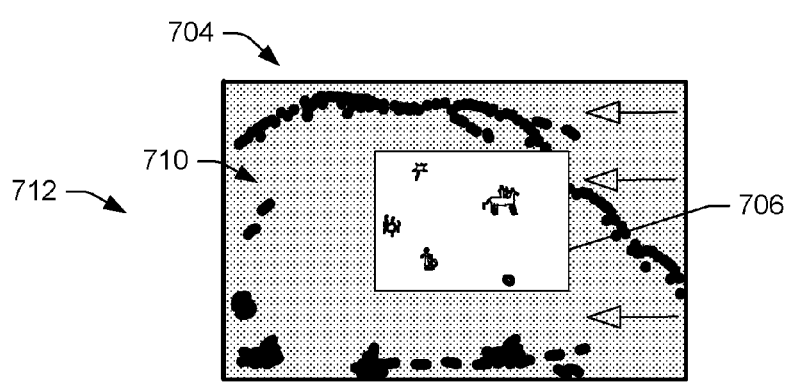

FIGS. 7A-7C illustrate an example process 700 of pausing a portion of a video (e.g., a copy of the portion of the video) while the video continues in a background. At 702 in FIG. 7A, an interface 704 may display a video of the environment 112 to the user 110 (e.g., in real-time as the video is being captured). While the video is being displayed at 702, the user 110 may select an area 706 of the video to pause. In this example, the selection is made through touch input via the interface 704, however, in other examples other types of input may be provided.

Upon selecting the area 706, the area 706 of the video may be paused, as shown at 708 in FIG. 7B. That is, a copy of the area 706 of the video may be created and displayed in a foreground. As illustrated, the area 706 of the video may be displayed in an original format (e.g., as the content was displayed at 702), while the rest of the video may continue in real-time in a background 710 in a different format. For example, the video in the background 710 may be displayed with a different level of focus (e.g., more out of focus or in focus than the area 706), a different level of image resolution (e.g., with less or more image resolution than the area 706), a different level of transparency (e.g., with less or more transparency than the area 706), and so on. In this example, the video in the background 710 is blurred, while the area 706 is maintained as it was initially presented.

At 712 in FIG. 7C, the video may continue in the background 710 (e.g., continue a live feed) as the area 706 remains static (e.g., a copy of the video within the area 706 remains static). That is, a portion of a frame of the video that corresponds to the area 706 may be maintained in the interface 604, while the video continues displaying real-time content in the background 710 in a blurred manner. As illustrated, the video in the background 710 has shifted to the left. This may enable the user 110 to further examine the area 706 of the video without losing context of what is occurring in the live video.

Although not illustrated, at some point a signal may be received to end display of the area 706 and the video may continue from where it is currently at (e.g., display a live feed). In other words, the live feed of the video may return to being displayed in an original format without blurring and/or encompassing an entirety of the display screen. Alternatively, the video may continue from where it was when the input was received to pause the area 706 of the video.

In some instances, the service provider 106 may analyze the area 706 for augmentation content when the user 110 selects the area 706. For example, at any time during the process 700 after the user 110 provides the input identifying the area 706, the service provider 106 may perform image processing on the video within the area 706 and identify augmentation content that is relevant to an object within the area 706.

Figure 8:
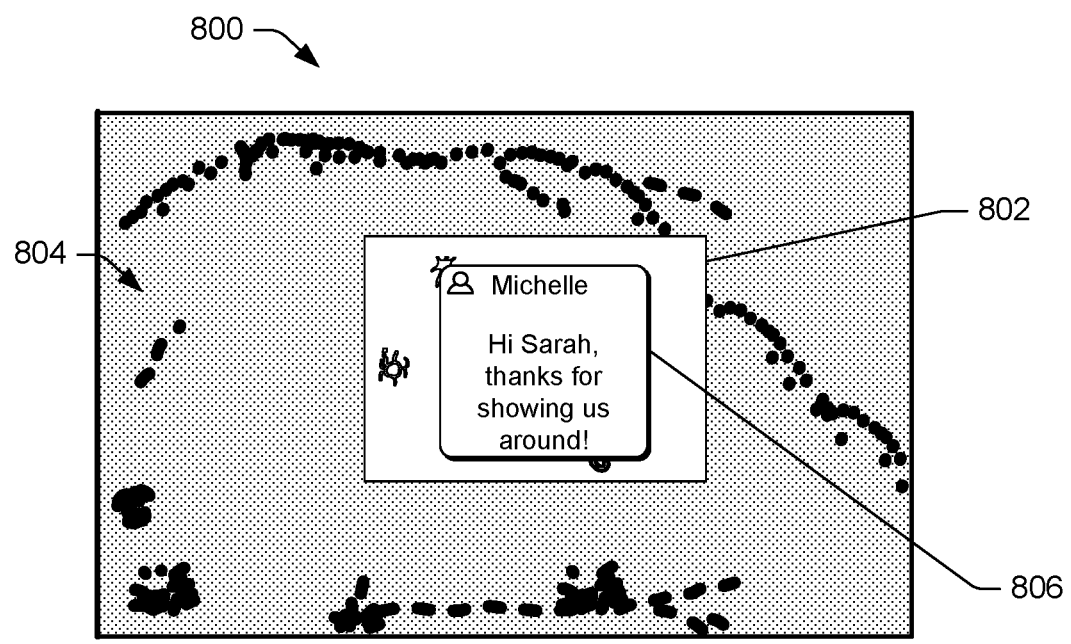
FIG. 8 illustrates an example interface to associate annotation data with a portion of a video.

FIG. 8 illustrates an example interface 800 to associate annotation data with a portion of a video. As illustrated, the interface 800 may display a static portion 802 of a video in a foreground and a live video in a background 804 in a blurred manner. Here, the interface 800 may be displayed to the user 110. While the static portion 802 of the video is being displayed, or at any other time, the user 110 may provide annotation data 806 to associate with the static portion 802 of the video. In this example, the user 110 (named Michelle) provides a note to the user 108 (named Sarah) to thank her for showing her around the environment 112. The annotation data 806 may be associated with a geographic location that is being displayed (e.g., a geographic location of the static portion 802). In other words, the annotation data 806 may be stored in a data store with an association to data representing the geographic location. This may allow others who visit the geographic location to view the annotation data 806. Additionally, or alternatively, the annotation data 806 may be provided to the user 108 in real-time as the annotation data 806 is received and/or at a later time.

Example Processes

Figure 9:
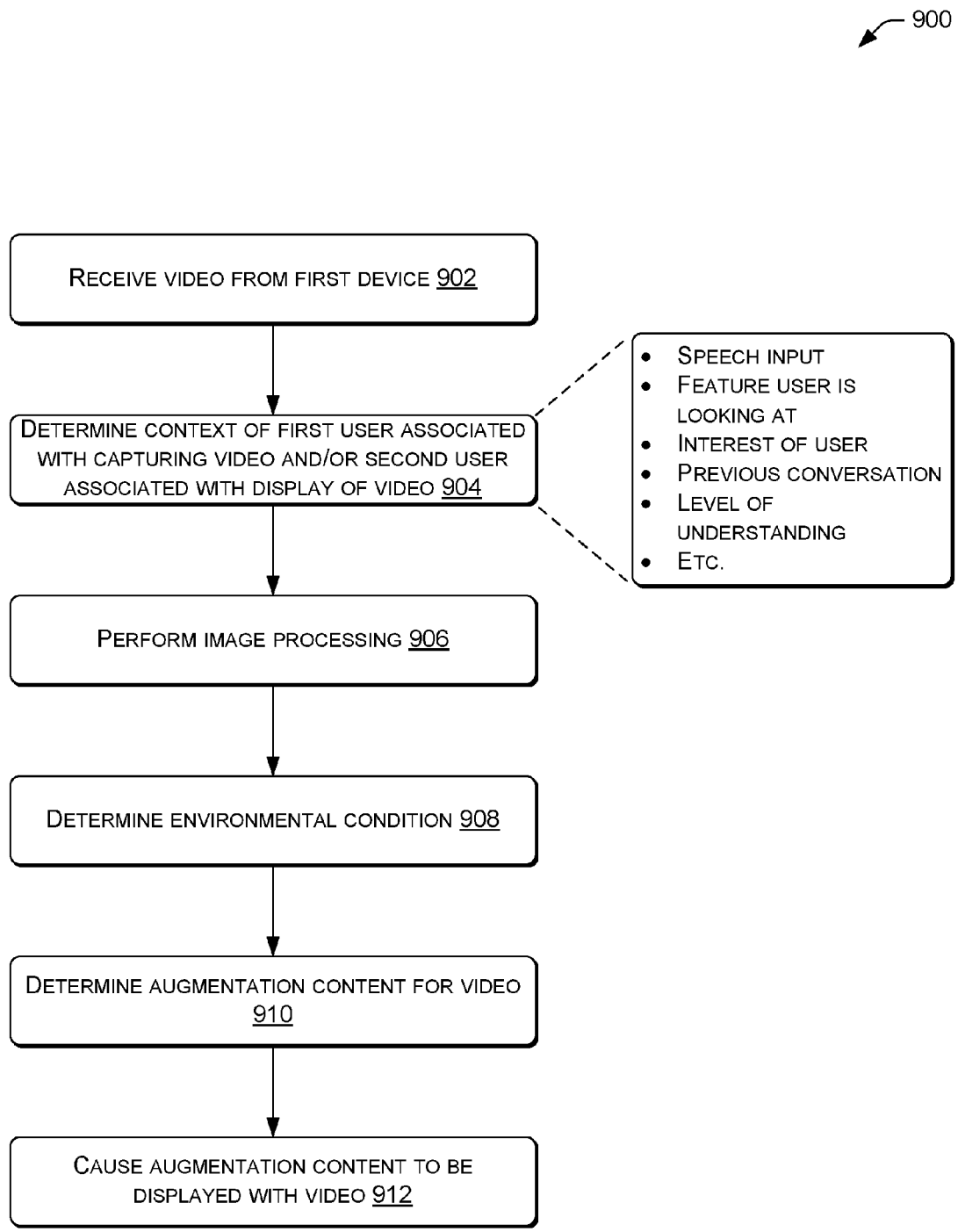
FIG. 9 illustrates an example process to augment a video with content.
Figure 10:
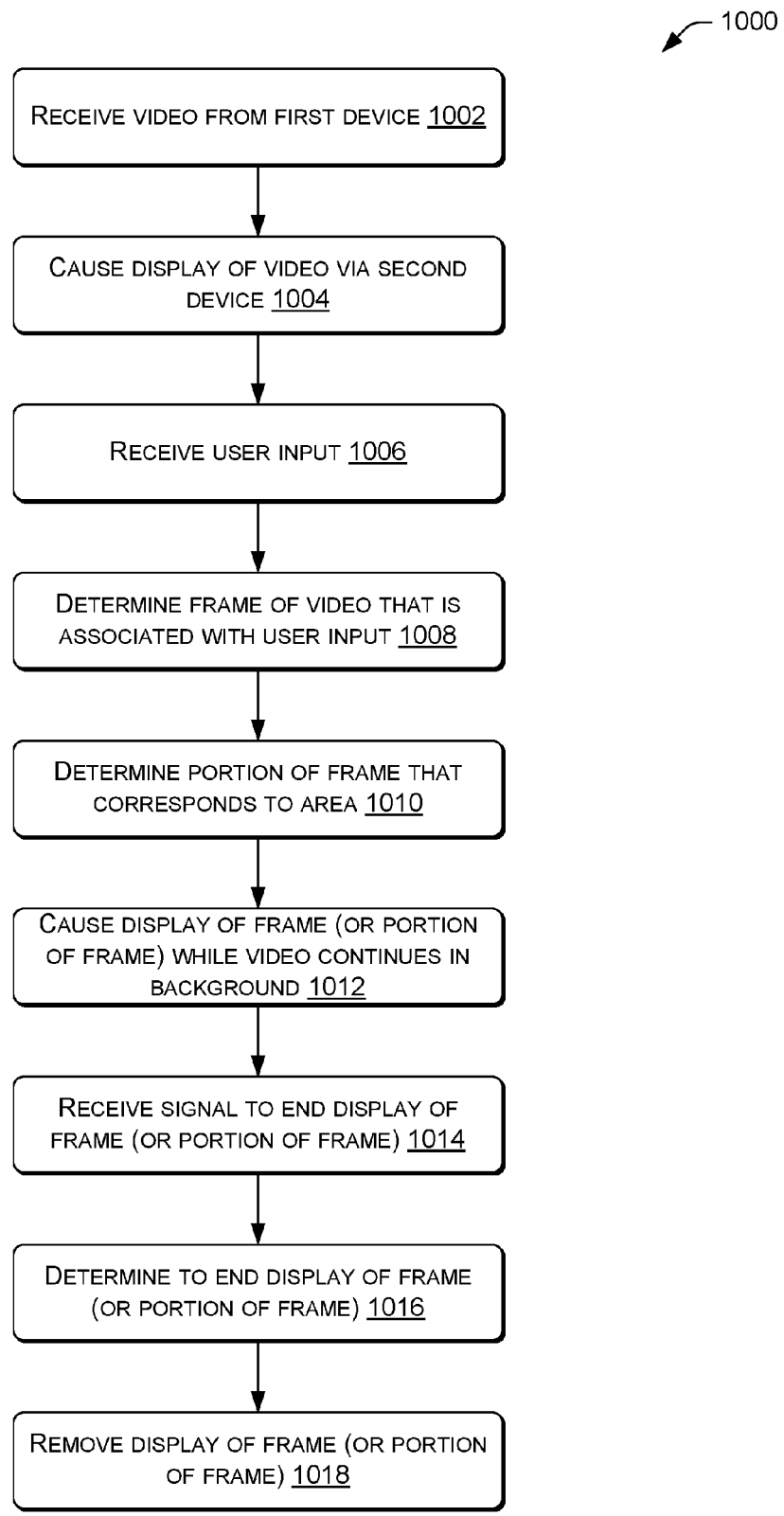
FIG. 10 illustrates an example process to maintain a portion of a video as the video continues to be displayed in a background and/or to remove display of the portion of the video.
Figure 11:
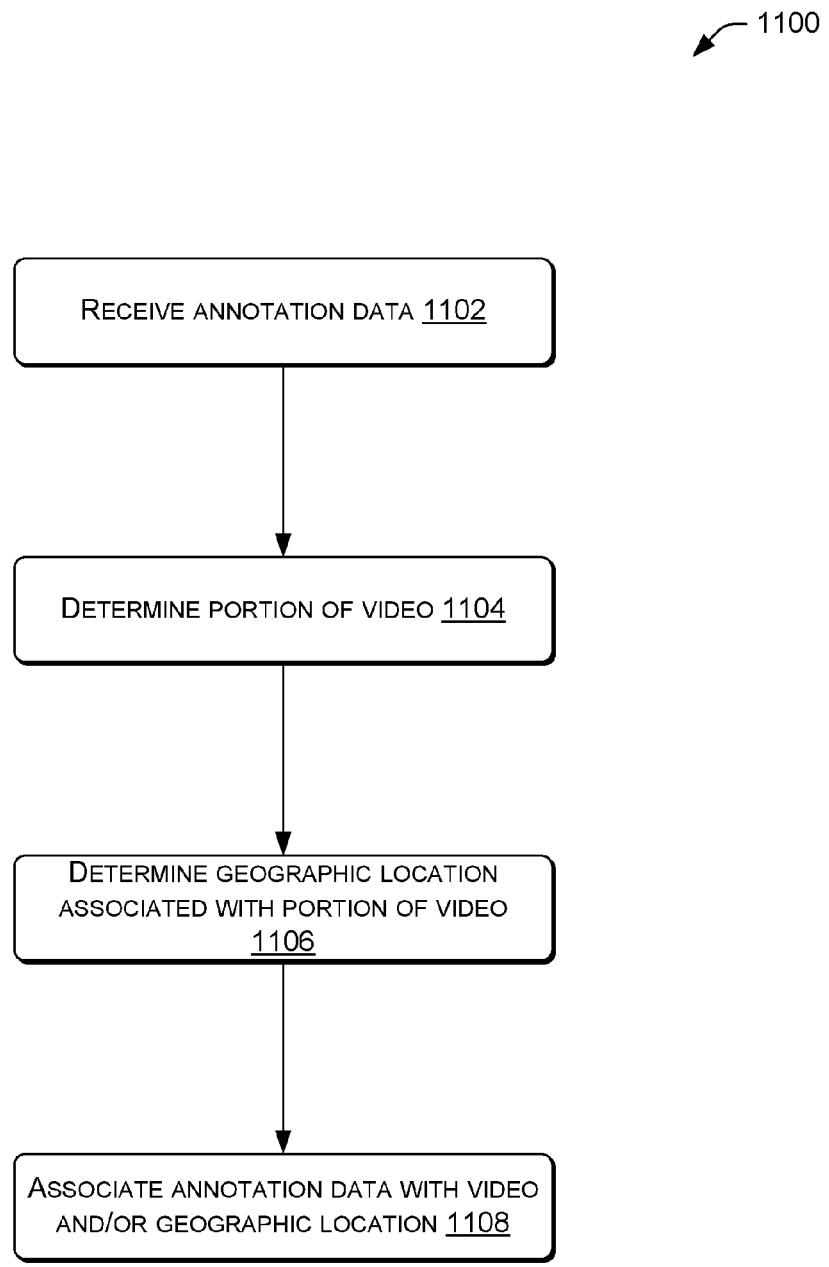
FIG. 11 illustrates an example process to associate annotation data with a video and/or geographic location.

FIGS. 9, 10, and 11 illustrate example processes 900, 1000, and 1100 for employing the techniques described herein. For ease of illustration the processes 900, 1000, and 1100 are described as being performed in the architecture 100 of FIG. 1. For example, one or more of the individual operations of the processes 900, 1000, and 1100 may be performed by the device 102, the service provider 106, and/or the device 104. However, the processes 900, 1000, and 1100 may be performed in other architectures. Moreover, the architecture 100 may be used to perform other processes.

The processes 900, 1000, and 1100 (as well as each process described herein) are illustrated as a logical flow graph, each operation of which represents a sequence of operations that can be implemented in hardware, software, or a combination thereof. The order in which the operations are described is not intended to be construed as a limitation, and any number of the described operations can be combined in any order and/or in parallel to implement the process. Further, any of the individual operations may be omitted. In the context of software, the operations represent computer-executable instructions stored on one or more computer-readable media that, when executed by one or more processors, configure the one or more processors to perform the recited operations. Generally, computer-executable instructions include routines, programs, objects, components, data structures, and the like that perform particular functions or implement particular abstract data types. In some instances, in the context of hardware the operations may be implemented in whole or in part by one or more hardware logic components to execute the described functions. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

FIG. 9 illustrates the example process 900 to augment a video with content.

At 902, a computing device (e.g., the device 102, the service provider 106, and/or the device 104) may receive video from a first device. This may include receiving the video from the first device as the first device captures the video. The video may represent an environment in which the first device is located. In some instances, the video comprises a panoramic video.

At 904, the computing device may determine a context of a first user that is associated with capturing the video and/or a second user that is associated with display of the video. The context may be based on speech or other input provided by the first user or second user (e.g., indicating what the respective user is talking about), gaze information for the first user or second user (e.g., indicating where the respective user is looking), a previous conversation of the first user or the second user, a user profile associated with the first user or the second user, a level of understanding of the first user or the second user, an area of interest within the video that is indicated by the first user or the second user, an interest of the first user or the second user, and so on.

At 906, the computing device may perform image processing on the video. This may include analyzing one or more frames of the video to identify a feature and/or tracking the feature throughout the one or more frames. In some instances, the image processing may analyze an area of interest that is indicated by the first user or the second user.

At 908, the computing device may determine an environmental condition of an environment (e.g., an environment that is being filmed). The environmental condition may include a location of the environment, a temperature of the environment, a time of day at which the video is being captured at the environment, and so on.

At 910, the computing device may determine augmentation content for the video. The determination may be based on a context of the first user that is associated with capturing the video, a context of the second user that is associated with displaying the video, an environmental condition, a feature identified within the video, and so on. In some instances, the operation 910 may include searching online to find content and/or retrieving the content from a source associated with the content. In other instances, the operation 910 may retrieve content that is stored locally or elsewhere. If content is found online, the computing device may, in some examples, summarize or otherwise process the content before providing the content as augmentation content.

At 912, the computing device may cause the augmentation content to be displayed with the video. This may include instructing a second device to display the video and/or the augmentation content. Alternatively, this may include displaying the video and/or the augmentation data. The augmentation content may be displayed in an overlaid manner on the video at a location of a feature in the video. Further, in many instances the augmentation content may be maintained in relation to the feature as the location of the feature changes within the video.

FIG. 10 illustrates the example process 1000 to maintain a portion of a video as the video continues to be displayed in a background and/or to remove display of the portion of the video.

At 1002, a computing device may receive video from a first device. This may include receiving the video as the video is being captured by the first device.

At 1004, the computing device may cause display of the video via a second device. This may include sending the video to the second device for display or displaying the video directly via the second device.

At 1006, the computing device may receive user input (or an indication) to pause the video.

At 1008, the computing device may determine a frame of the video that is associated with the user input (or indication). This may include identifying a frame of the video that is displayed when the user input is received.

At 1010, the computing device may determine a portion of the frame that corresponds to an area that is selected. In some instances, the operation 1010 is performed when the user input identifies a particular area of the video to pause. As such, the operation 1010 may be eliminated in some instances.

At 1012, the computing device may cause display of the frame (or the portion of the frame) while the video continues in a background. For example, a second instance of a frame (or a portion of the frame) may be created/copied and displayed in a foreground, while a live video continues display in a background. The operation 1012 may include instructing the second device to display of the frame (or portion of the frame) in a foreground and to continue displaying the rest of the video in the background. Alternatively, the operation 1012 may include displaying the frame (or portion of the frame) in a foreground and continuing to display the rest of the video in the background on the second device. In some instances, the frame (or portion of the frame) may be displayed according to a first display characteristic and the video in the background may be displayed according to a second display characteristic that is different, such as a different level of focus, level of image resolution, and/or level of transparency. As such, the operation 1012 may pause a portion of a video (e.g., a copy of the portion of the video) while the video continues displaying in the background. In some instances, the operation 1012 may include smoothing movement of content within the video that is displayed in the background and/or the foreground (e.g., removing jitter, harsh movements, etc.).

At 1014, the computing device may receive a signal to end display of the frame (or the portion of the frame). The signal may be received from the first device that is capturing the video and/or the second device that is presenting the video. The signal may comprise user input requesting that display of the frame (or portion of the frame) end, a trigger signal generated upon detection of an event (e.g., arrival at a particular location, receipt of an audio signal associated with voice input, lapse of a period of time, etc.), and so on.

At 1016, the computing device may determine to end display of the frame (or the portion of the frame). The operation 1016 may be performed in response to receiving the signal at the operation 1014 or in response to other determinations.

At 1018, the computing device may remove display of the frame (or the portion of the frame). This may include instructing the second device that is presenting the frame (or the portion of the frame) to end presentation or directly removing presentation of the frame (or the portion of the frame).

FIG. 11 illustrates the example process 1100 to associate annotation data with a video and/or geographic location.

At 1102, a computing device may receive annotation data. The annotation data may comprise any type of content, such as images, audio, input, video, etc.

At 1104, the computing device may determine a portion of a video that is currently being presented when the annotation data is received (e.g., a paused frame that is being presented).

At 1106, the computing device may determine a geographic location associated with the portion of the video. This may include referencing GPS or other location data associated with a device that is capturing the video, performing image processing to identify a feature in the video and a corresponding geographic location of the feature, and so on.

At 1108, the computing device may associate annotation data with the video (e.g., the portion of the video) and/or the geographic location. In some instances, when the annotation data is associated with the geographic location, individuals may access the annotation data when exploring the geographic location (e.g., in a virtual reality or mixed reality context).

Example Panoramic System

Figure 12:
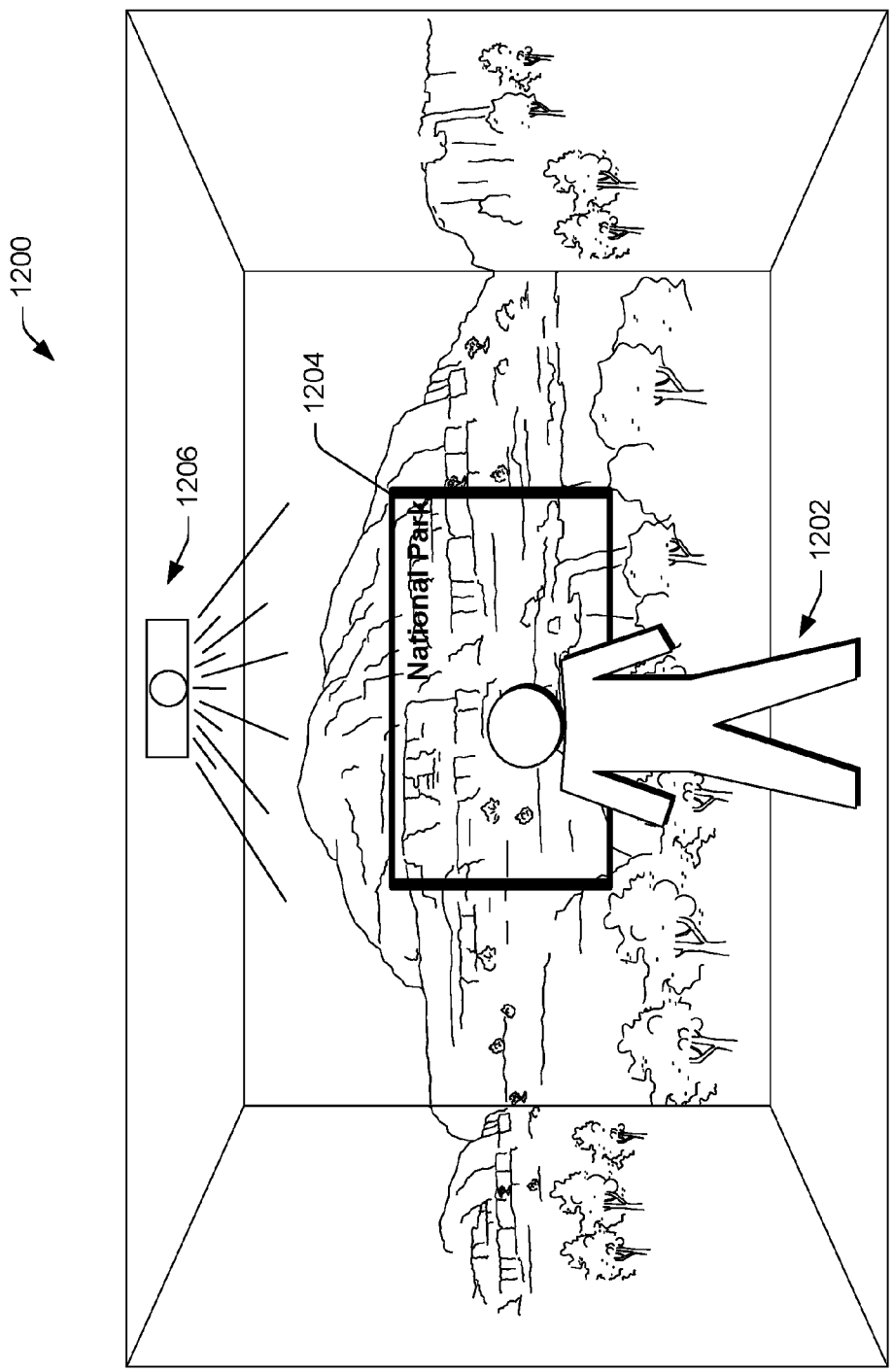
FIG. 12 illustrates an example panoramic system to explore a remote environment.

FIG. 12 illustrates an example panoramic system 1200 to explore a remote environment. The panoramic system 1200 may include various equipment, such as any of the components discussed above with reference to FIG. 3, to facilitate a panoramic experience for a user 1202. In this example, the panoramic system 1200 includes a touch surface 1204 to enable the user 1202 to navigate within the remote environment. For example, the user 1202 may touch the touch surface 1204 with a hand or finger and scroll from side to side or up and down. This may cause an orientation of the remote environment to change. To illustrate, if the user 1202 provides touch input in a right to left motion, then the panoramic system 120 may move the video or still image content so that content that was located on a right-side of the user 1202 in now moved toward the left-side of the user 1202. As illustrated, the panoramic system 1200 also includes a projector 1206 to project video and/or still image content onto walls, floors, and/or a ceiling within the panoramic system 1200. In some instances, the panoramic system 1200 may enable the user 1202 to explore the remote environment.

Example Clauses

Example A, a method comprising: receiving, by one or more computing devices, a panoramic video from a first device, the panoramic video representing an environment in which the first device is located; determining, by the one or more computing devices, a context of at least one of a first user associated with the first device or a second user associated with a second device that is designated to receive the panoramic video; based at least in part on the context and by the one or more computing devices, determining augmentation content that relates to a feature in the panoramic video; and causing, by the one or more computing devices, the augmentation content to be displayed via the second device along with the panoramic video to augment the panoramic video, the augmentation content being displayed in relation to a location of the feature in the panoramic video.

Example B, the method of example A, wherein the determining the context includes: receiving, from the first device, speech input associated with the first user, the speech input being captured while the panoramic video is being captured; and processing the speech input to determine that the speech input relates to the feature; the method further comprising: performing image processing of the panoramic video to identify the feature in the panoramic video.

Example C, the method of example A or B, wherein the determining the context includes: receiving, from the second device, speech input associated with the second user, the speech input being captured while the panoramic video is being displayed; and processing the speech input to determine that the speech input relates to the feature; the method further comprising: performing image processing of the panoramic video to identify the feature in the panoramic video.

Example D, the method of any of examples A-C, wherein the determining the context includes determining, based at least in part on gaze tracking data of the first user, that the first user is looking at the feature within the environment.

Example E, the method of any of examples A-D, wherein the determining the context includes determining that the second user is looking at the location of the feature in the panoramic video.

Example F, the method of any of examples A-E, wherein the determining the context includes determining an interest of the second user or a previous conversation that the second user has had with an intelligent personal assistant; and wherein the determining the augmentation content includes determining the augmentation content that relates to at least one of the interest of the second user or the previous conversation that the second user has had with the intelligent personal assistant.

Example G, the method of any of examples A-F, wherein the receiving the panoramic video from the first device comprises receiving the panoramic video from a head-mounted device that captures the panoramic video.

Example H, a system comprising: one or more processors; and memory communicatively coupled to the one or more processors and storing executable instructions that, when executed by the one or more processors, cause the one or more processors to perform operations comprising: obtaining a video representing an environment in which a first user is located; determining a context of at least one of the first user or a second user associated with a device that is designated to receive the video; determining augmentation content based at least in part on the context; and providing the augmentation content and the video for display in substantially real-time via the device associated with the second user, the augmentation content to be displayed in an overlaid manner on the video.

Example I, the system of example H, wherein the providing the augmentation content and the video for display includes: designating the augmentation content to be displayed in an overlaid manner on the video at a location of a feature in the video; and maintaining the augmentation content in relation to the feature as the location of the feature changes within the video.

Example J, the system of example H or I, wherein the determining the augmentation content includes receiving, from a device associated with the first user, annotation data to be used as the augmentation content.

Example K, the system of any of examples H-J, wherein the determining the context includes receiving input from a device associated with the first user, the input identifying an area of interest; the operations further comprising: analyzing the video with respect to the area of interest to identify a feature; and wherein the determining the augmentation content includes determining augmentation content that relates to the feature.

Example L, the system of any of examples H-K, wherein the determining the context includes receiving input from the device associated with the second user, the input identifying an area of interest; the operations further comprising: analyzing the video with respect to the area of interest to identify a feature; and wherein the determining the augmentation content includes determining augmentation content that relates to the feature.

Example M, the system of any of examples H-L, wherein the determining the context includes determining a level of understanding of the second user with respect to content of the video based on at least one of a user profile for the second user or a previous conversation of the second user with an intelligent personal assistant; and wherein the determining the augmentation content includes determining augmentation content that relates to the level of understanding of the second user with respect to content of the video.

Example N, the system of any of examples H-M, wherein the operations further comprise: receiving, from the device associated with the second user, annotation data regarding the video; receiving, from the device associated with the second user, a selection of a portion of the video; determining a geographic location associated with the portion of the video; and storing an association between the annotation data and the geographic location.

Example O, the system of any of examples H-N, wherein the operations further comprise: determining an environmental condition of the environment, the environmental condition including at least one of a location of the environment, a temperature of the environment, or a time of day at which the video is being captured at the environment; and wherein the augmentation content includes content indicating the environmental condition.

Examples P, the system of any of examples H-O, wherein the obtaining the video comprises receiving the video from a head-mounted device configured to capture the video of the environment.

Example Q, a system comprising: one or more processors; and memory communicatively coupled to the one or more processors and storing executable instructions that, when executed by the one or more processors, cause the one or more processors to perform operations comprising: displaying a video representing an environment in which a first device is located; receiving input regarding augmentation of the video; identifying augmentation content that relates to a feature in the video, the augmentation content being based at least in part on the input; and outputting the augmentation content as the video is displayed.

Example R, the system of example Q, wherein the receiving the input comprises receiving speech input via an intelligent personal assistant.

Example S, the system of example Q or R, wherein the identifying the augmentation content includes: searching online to find content that is related to the feature in the video; and retrieving the content from a source associated with the content.

Example T, the system of any of examples Q-S, wherein the video comprises a panoramic video; the system further comprising: a panoramic display screen configured to display the augmentation content and the video.

Example AA, a method comprising: causing, by one or more computing devices, display of a live video; receiving, by the one or more computing devices, user input selecting an area of the live video; and based at least in part on the user input and by the one or more computing devices: determining a frame of the live video that is associated with the user input; determining a portion of the frame that corresponds to the area selected by the user input; and causing display of the portion of the frame in focus in an overlaid manner over the live video while display of the live video continues out of focus.

Example BB, the method of example AA, further comprising: receiving the live video from a first device as the live video is being captured by the first device; wherein the causing display of the live video comprises sending the live video to a second device for display via the second device.

Example CC, the method of example BB, further comprising: receiving, from the first device, a signal to end display of the portion of the frame, the signal comprising at least one of user input requesting that display of the portion of the frame end or a trigger signal generated upon detection of an event at the first device; and based at least in part on the signal, removing display of the portion of the frame and causing display of the live video in focus.

Example DD, the method of example CC, wherein the signal comprises the trigger signal that is generated upon detection of the event at the first device, the event comprising at least one of arrival of the first device at a particular location or receipt of an audio signal associated with voice input.

Example EE, the method of example BB, further comprising: receiving, from the second device, a signal to end display of the portion of the frame, the signal comprising at least one of user input requesting that display of the portion of the frame end or a trigger signal generated upon detection of an event at the second device; and based at least in part on the signal, removing display of the portion of the frame and causing display of the live video in focus.

Example FF, the method of example EE, wherein the signal comprises the trigger signal that is generated upon detection of the event at the second device, the event comprising lapse of a period of time since displaying the portion of the frame or receipt of an audio signal associated with voice input.

Example GG, a system comprising: one or more processors; and memory communicatively coupled to the one or more processors and storing executable instructions that, when executed by the one or more processors, cause the one or more processors to perform operations comprising: causing display of a live video; receiving user input selecting an area of the live video; and based at least in part on receiving the user input, pausing display of a portion of the live video that is within the area and causing display of the live video to continue in a background while the portion of the live video is paused.

Example HH, the system of example GG, wherein: the causing display of the live video comprises causing display of the live video according to a first display characteristic; and the causing display of the live video to continue in the background while the portion of the live video is paused includes causing display of the live video to continue in the background according to a second display characteristic that is different than the first display characteristic.

Example II, the system of example HH, wherein the first display characteristic and the second display characteristic each comprise at least one of a level of focus, a level of image resolution, or a level of transparency.

Example JJ, the system of any of examples GG-II, wherein the causing display of the live video to continue in the background while the portion of the live video is paused includes smoothing movement of content within the live video that is displayed in the background.

Example KK, the system of any of examples GG-JJ, wherein the operations further comprise: receiving user input requesting that the portion of the live video be removed from being displayed; and based at least in part on receiving the user input, ending the display of the portion of the live video.

Example LL, the system of any of examples GG-KK, wherein the operations further comprise: determining that a period of time has expired since pausing display of the portion of the live video; and based at least in part on the determining that the period of time has expired since pausing display of the portion of the live video, ending the display of the portion of the live video.

Example MM, the system of any of examples GG-LL, wherein the operations further comprise: receiving an audio signal from at least one of a device associated with capturing the live video or a device designated to display the live video; determining that the audio signal is voice input; and based at least in part on the determining that the audio signal is voice input, ending the display of the portion of the live video.

Example NN, the system of any of examples GG-MM, wherein the operations further comprise: receiving, from at least one of a device associated with capturing the live video or a device designated to display the live video, annotation data for the portion of the live video; determining a geographic location associated with the portion of the video; and associating the annotation data with geographic location.

Example OO, a system comprising: one or more processors; and memory communicatively coupled to the one or more processors and storing executable instructions that, when executed by the one or more processors, cause the one or more processors to perform operations comprising: receiving a video from a first device as the video is being captured by the first device; in response to receiving the video, causing the video to be displayed via the second device; receiving an indication from the second device to pause a portion of the video; and based at least in part on receiving the indication from the second device, causing the portion of the video to be displayed via the second device in an overlaid manner on the video while display of the video continues in a background.

Example PP, the system of example OO, wherein the portion of the video comprises a defined region within a frame of the video.

Example QQ, the system of example OO or PP, wherein: the causing the video to be displayed via the second device comprises causing the video to be displayed according a first display characteristic; and the causing the portion of the video to be displayed via the second device in the overlaid manner on the video while display of the video continues in the background includes causing display of the live video to continue in the background according to a second display characteristic that is different than the first display characteristic.

Example RR, the system of example QQ, wherein the first display characteristic and the second display characteristic each comprise a level of image resolution.

Example SS, the system of example QQ, wherein the first display characteristic and the second display characteristic each comprise a level of transparency.

Example TT, the system of any of examples OO-SS, wherein the operations further comprise: receiving annotation data for the portion of the video; determining a geographic location associated with the portion of the video; and associating the annotation data with geographic location.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   receiving a live video from a first device as the live video is being captured by the first device;
   causing, by one or more computing devices, display of the live video;
   receiving, by the one or more computing devices, user input selecting an area of the live video;
   based at least in part on the user input and by the one or more computing devices:
      determining a frame of the live video that is associated with the user input;
      determining a portion of the frame that corresponds to the area selected by the user input; and
      causing display of the portion of the frame in focus in an overlaid manner over the live video while display of the live video continues out of focus;
   receiving, from at least one of the one or more computing devices, a signal to end display of the portion of the frame, the signal comprising at least one of (i) user input requesting that display of the portion of the frame end or (ii) a trigger signal generated upon detection of an event at the at least one of the one or more computing devices; and based at least in part on the signal, updating display of the live video to cause display of the live video in focus.

2. The method of claim 1, further comprising:
wherein the causing display of the live video comprises sending the live video to a second device for display via the second device.

3. The method of claim 1, wherein receiving, from at least one of the one or more computing devices, the signal to end display of the portion of the frame includes:
receiving, from the first device, the signal to end display of the portion of the frame, the signal comprising at least one of (i) user input requesting that display of the portion of the frame end or (ii) a trigger signal generated upon detection of an event at the first device, and
wherein based at least in part on the signal, updating display of the live video includes:
based at least in part on the signal, removing display of the portion of the frame and causing display of the live video in focus.

4. The method of claim 3, wherein the signal comprises the trigger signal that is generated upon detection of the event at the first device, the event comprising at least one of arrival of the first device at a particular location or receipt of an audio signal associated with voice input.

5. The method of claim 1, wherein receiving, from at least one of the one or more computing devices, the signal to end display of the portion of the frame includes:
receiving, from a second device, a signal to end display of the portion of the frame, the signal comprising at least one of (i) user input requesting that display of the portion of the frame end or (ii) a trigger signal generated upon detection of an event at the second device, and
wherein based at least in part on the signal, updating display of the live video includes:
based at least in part on the signal, removing display of the portion of the frame and causing display of the live video in focus.

6. The method of claim 5, wherein the signal comprises the trigger signal that is generated upon detection of the event at the second device, the event comprising lapse of a period of time since displaying the portion of the frame or receipt of an audio signal associated with voice input.

7. A system comprising:
one or more processors; and
memory communicatively coupled to the one or more processors and storing executable instructions that, when executed by the one or more processors, cause the one or more processors to perform operations comprising:
receiving a live video from a first device as the live video is being captured by the first device;
causing display of the live video on at least one second device;
receiving, from the at least one second device, user input selecting an area of the live video;
based at least in part on receiving the user input from the at least one second device:
determining a frame of the live video that is associated with the user input;
determining a portion of the frame that corresponds to the area selected by the user input; and
causing display of the portion of the frame in focus in an overlaid manner over the live video while display of the live video continues out of focus;
receiving, from the at least one of the one second device, a signal to pause display of the portion of the frame; and
based at least in part on the signal, causing display of the live video to continue in a background while the portion of the frame is paused, wherein the causing display of the live video to continue in the background while the portion of the frame is paused includes smoothing movement of content within the live video that is displayed in the background.

8. The system of claim 7, wherein:
the causing display of the live video comprises causing display of the live video according to a first display characteristic; and
the causing display of the live video to continue in the background while the portion of the frame is paused includes causing display of the live video to continue in the background according to a second display characteristic that is different than the first display characteristic.

9. The system of claim 8, wherein the first display characteristic and the second display characteristic each comprise at least one of a level of focus, a level of image resolution, or a level of transparency.

10. The system of claim 7, wherein the operations further comprise:
receiving user input requesting that the portion of the frame be removed from being displayed; and
based at least in part on receiving the user input, ending the display of the portion of the frame.

11. The system of claim 7, wherein the operations further comprise:
determining that a period of time has expired since pausing display of the portion of the frame; and
based at least in part on the determining that the period of time has expired since pausing display of the portion of the frame, ending the display of the portion of the frame.

12. The system of claim 7, wherein the operations further comprise:
receiving an audio signal from at least one of the first device or the at least one second device;
determining that the audio signal is voice input; and
based at least in part on the determining that the audio signal is voice input, ending the display of the portion of the frame.

13. The system of claim 7, wherein the operations further comprise:
receiving, from at least one of the first device or the at least one second device, annotation data for the portion of the frame;
determining a geographic location associated with the portion of the frame; and
associating the annotation data with the geographic location.

14. A system comprising:
one or more processors; and
memory communicatively coupled to the one or more processors and storing executable instructions that, when executed by the one or more processors, cause the one or more processors to perform operations comprising:
receiving a video from a first device as the video is being captured by the first device;

in response to receiving the video, causing the video to be displayed via at least one second device;

receiving, from the at least one second device, user input selecting an area of the video;

based at least in part on the user input and from the at least one second device:
- determining a frame of the video that is associated with the user input;
- determining a portion of the frame that corresponds to the area selected by the user input;
- causing display of the portion of the frame in focus in an overlaid manner over the live video while display of the video continues out of focus;

receiving, from the at least one second device, a signal to pause the portion of the frame; and based at least in part on receiving the signal from the at least one second device, causing the portion of the frame to be displayed via the at least one second device in an overlaid manner on the video while display of the video continues in a background, wherein the causing display of the video to continue in the background while the portion of the frame is paused includes smoothing movement of content within the video that is displayed in the background.

15. The system of claim 14, wherein the portion of the frame comprises a defined region within the video.

16. The system of claim 14, wherein:
the causing the video to be displayed via the at least one second device comprises causing the video to be displayed according a first display characteristic; and
the causing the portion of the frame to be displayed via the second device in the overlaid manner on the video while display of the video continues in the background includes causing display of the video to continue in the background according to a second display characteristic that is different than the first display characteristic.

17. The system of claim 16, wherein the first display characteristic and the second display characteristic each comprises a level of image resolution.

18. The system of claim 16, wherein the first display characteristic and the second display characteristic each comprises a level of transparency.

19. The system of claim 14, wherein the operations further comprise:
receiving annotation data for the portion of the frame;
determining a geographic location associated with the portion of the frame; and associating the annotation data with the geographic location.

20. The system of claim 14, wherein the operations further comprise:
receiving an audio signal from at least one of the first device or the at least one second device;
determining that the audio signal is voice input; and
based at least in part on the determining that the audio signal is voice input, ending the display of the portion of the frame.

\* \* \* \* \*